US008180678B2

(12) United States Patent
Brotherston

(10) Patent No.: US 8,180,678 B2
(45) Date of Patent: May 15, 2012

(54) APPARATUS AND METHOD FOR PROVIDING PRODUCTS AND SERVICES IN A TRANSPORT VEHICLE USING A NETWORK OF COMPUTERS

(76) Inventor: David N. Brotherston, San Clemente, CA (US)

( * ) Notice: Subject to any disclaimer, the term of this patent is extended or adjusted under 35 U.S.C. 154(b) by 3986 days.

(21) Appl. No.: 09/682,583

(22) Filed: Sep. 21, 2001

(65) Prior Publication Data

US 2002/0010633 A1 Jan. 24, 2002

Related U.S. Application Data

(63) Continuation of application No. PCT/US00/10031, filed on Apr. 12, 2000.

(51) Int. Cl.
*G06Q 20/00* (2012.01)
(52) U.S. Cl. .......................................................... 705/22
(58) Field of Classification Search ................ 705/1, 15, 705/26, 35–40, 22
See application file for complete search history.

(56) References Cited

U.S. PATENT DOCUMENTS

| 4,428,078 | A |   | 1/1984  | Kuo |
| 4,530,067 | A | * | 7/1985  | Dorr .............................. 705/15 |
| 4,553,222 | A | * | 11/1985 | Kurland et al. ................. 705/15 |
| 5,006,985 | A | * | 4/1991  | Ehret et al. ........................ 705/1 |
| 5,024,398 | A |   | 6/1991  | Riedinger et al. |
| 5,299,116 | A |   | 3/1994  | Owens et al. |
| 5,311,302 | A | * | 5/1994  | Berry et al. ................. 348/14.03 |
| 5,444,444 | A | * | 8/1995  | Ross .............................. 340/994 |
| 5,568,484 | A |   | 10/1996 | Margis |
| 5,646,389 | A | * | 7/1997  | Bravman et al. .............. 235/385 |
| 5,727,163 | A | * | 3/1998  | Bezos ............................. 705/50 |
| 5,812,531 | A |   | 9/1998  | Cheung et al. |
| 5,845,263 | A | * | 12/1998 | Camaisa et al. ................. 705/15 |
| 5,850,433 | A | * | 12/1998 | Rondeau ................... 379/218.01 |

(Continued)

FOREIGN PATENT DOCUMENTS

CA        2033054 A1    12/1990

(Continued)

OTHER PUBLICATIONS

Airborne Broadband Wireless Link Demonstrated, Microwave Journal, Nov. 1998, p. 45.

(Continued)

*Primary Examiner* — Olabode Akintola

(57) ABSTRACT

Computer network system for providing, and managing delivery of, products and services to persons on a transport vehicle. An exemplary network (10) includes: Computers (11a through 11c), such as laptop computers, used by persons on the vehicle (15) to request and receive services; A member computer (12) used by the operator crew to request and receive services; Member handheld computers (13a through 13b) used by cabin attendants to manage delivery of products and services; A computer server onboard the vehicle for storing data, performing calculations, and acting as a communications gateway to other members in the network; A communications link (16) to a ground fixed router (17); A ground router (17) for access to the Internet and other members of the network; A computer server for managing product inventory and product delivery (18); A computer for recording inventory (19), and Computer kiosks (20a and 20b) at departure and arrival ports for passenger ordering. The network of computers provides more precise control over product and service ordering, inventory management, and the delivery of the product and services. The network supports a preferred transaction method using credit cards and debit "phone cards" allowing cash-less delivery of products and services.

25 Claims, 30 Drawing Sheets

U.S. PATENT DOCUMENTS

| | | | | |
|---|---|---|---|---|
| 5,969,968 | A | * | 10/1999 | Pentel .............................. 705/26 |
| 5,979,757 | A | * | 11/1999 | Tracy et al. ................... 235/383 |
| 6,026,375 | A | * | 2/2000 | Hall et al. .................. 705/26.43 |
| 6,058,288 | A | | 5/2000 | Reed et al. |
| 6,122,620 | A | * | 9/2000 | Weber ............................... 705/6 |
| 6,123,259 | A | * | 9/2000 | Ogasawara ................... 235/380 |
| 6,177,887 | B1 | * | 1/2001 | Jerome .......................... 725/76 |
| 6,201,797 | B1 | * | 3/2001 | Leuca et al. ................. 370/316 |
| 6,249,774 | B1 | * | 6/2001 | Roden et al. .................... 705/28 |
| 6,760,757 | B1 | * | 7/2004 | Lundberg et al. ............ 709/217 |

FOREIGN PATENT DOCUMENTS

| | | |
|---|---|---|
| EP | 0 890 907 A1 | 1/1999 |
| EP | 0890907 A1 * | 1/1999 |
| GB | 2 235 800 A | 3/1991 |
| WO | 95/27949 A1 | 10/1995 |
| WO | WO 00/14987 A1 | 3/2000 |

OTHER PUBLICATIONS

Huskisson, K. et al., 3-Tier Technology Enhances Plant CMMS, Power Engineering, Feb. 1999, p. 47.

Kiosks Offer Convenience and Cost Effectiveness in Airports, World Arline News, Dec. 4, 1998, p. 1.

British Airways selects Rockwell for advanced in-flight entertainment system techology, M2 Presswire, Feb. 17, 1998.

Esler, D., Putting the business in your business jet, Business and Commerical Aircraft, Sep. 1998, vol. 83, Issue 3, p. 98.

* cited by examiner

APPARATUS AND METHOD FOR PROVIDING PRODUCTS AND SERVICES IN A TRANSPORT VEHICLE USING A NETWORK OF COMPUTERS

CROSS REFERENCE TO RELATED APPLICATIONS

This application is a continuation of prior co-pending International PCT Application No. PCT/US00/10031, filed Apr. 12, 2000, the benefit of the priority date of which is hereby claimed under 35 USC 120. In turn, International PCT Application No. PCT/US00/10031 claims pursuant to 35 USC 119, the benefit of the filing date of prior co-pending U.S. Provisional Application No. 60/129,998, filed Apr. 19, 1999.

FIELD OF THE INVENTION

The present invention relates generally to computer networking systems, and in particular to computer network systems for transport vehicles.

BACKGROUND OF THE INVENTION

Cabin services in transport vehicles such as commercial aircraft include: 1) providing information such as operational and safety instructions, 2) providing entertainment and convenience features such as audio, movies and telephones, 3) providing products such as meals that are included in the price of the ticket, 4) selling products such as beverages for cash. The first three of these only indirectly generate revenue by making the overall product more desirable but, requiring installed equipment, they typically involve significant costs that may negatively impact revenue because of higher ticket prices. Where product is sold, significant losses are associated with the mismanagement of cash. In both cases involving commodities there is significant loss from mismanagement of the product and the model simply doesn't support a wide range of products. In all the cases above there is little data to support analysis, and little ability to finesse the market.

A system design of this invention provides a more cost effective model for delivering information, and entertainment, expands the range of products, controls product flow, tracks product distribution, and removes cash from the transaction, and therefore is a solution that addresses each of the problems cited above. The design actually allows a new paradigm in which cabin service is a true profit center and ticket price is uncoupled. Customer satisfaction is enhanced by offering superior services tailored to individual demand.

With the option to pre-purchase product via the Internet or at Gate Kiosks, product flow is controlled thereby allowing a broader range of products tailored to specific tastes. A whole new set of products for the laptop user is possible including e-mail, aircraft information, airline schedules and DVD audio/video. The use of credit cards and debit "phone cards" simplifies purchasing for the consumer permitting higher volumes of onboard consumables and electronic purchase of off-board consumables. Rigorously tracking product distribution eliminates loss from mismanagement and the provision for credit/debit transactions eliminates loss of cash revenue. With cabin entertainment delivered via laptops provided by the customer, installation and maintenance costs associated with installed entertainment systems is also eliminated without sacrificing availability of the product. The rigorous tracking provides the data to support detailed analysis of productivity associated with both the travel and service commodities.

SUMMARY OF INVENTION

In accordance with the present invention, a network of computers for providing products and services to passengers and crew on a transport vehicle such as a commercial aircraft comprises 1) a plurality of member computers called Passenger Laptops used by the passengers onboard the transport vehicle to request and receive services, 2) a member computer used by the operator crew to request and receive services, 3) a plurality of member handheld computers called Handheld Modules used by cabin attendants to manage the delivery of products and services to the passengers, 4) a computer server called a Cabin Server onboard the vehicle for storing data, performing calculations, and acting as a communications gateway to other members in the network, 5) a communications link called Communications Link to a ground fixed router, 6) a ground router called a Ground Router for access to the Internet and other members of the network, 7) a computer server for managing product inventory called and Inventory & Services Server, 8) a computer for recording inventory called Inventory Client, and 9) a plurality of computer kiosks at departure and arrival ports called Gate Kiosks for passenger ordering.

The purpose of the network is to provide a wider range of products and services to the passenger more efficiently and with greater revenue potential. The network architecture may be viewed as a three-tier model: an overlapping linkage of two sub-networks built on top of the Internet. At the top level is a small network onboard the aircraft, comprising members 1 through 4 above. The airborne network interfaces with the larger ground based network that includes members 7 through 9 above. Both these sub-networks interface directly or indirectly with the Internet.

In the ground-based subnetworks, each Gate Kiosk or similar software on the Internet is the means for passengers to submit credit card information and pre-order product and services. For passengers with Passenger Laptops the Gate Kiosk can update Passenger Laptop customer access software on a floppy diskette or other similar media and may also dispense floppy diskettes with Passenger Laptop customer access software. The Gate Kiosk or similar software on the Internet communicates with the Inventory & Services Server via Local Area Network (LAN), Internet, or other network. The Inventory & Services Server provides product availability based on inventory and stores customer data for transfer to the Cabin Server.

In the subnetwork onboard the transportation vehicle, each Passenger Laptop communicates with the Cabin Server via wireless Ethernet LAN (RF Ethernet) or any other installed wired LAN. The Cabin Server provides the Passenger Laptop with updates to the customer record, accepts new requests for service, and delivers services that are hosted on the Cabin Server. Each Handheld Module also communicates with the Cabin Server via RF Ethernet. The Cabin Server provides the Handheld Module with updates to the customer record and accepts new requests for service from passengers who do not have a Passenger Laptop. In this capacity, the cabin attendant may use the credit card reader of the Handheld Module. The bar code reader of the Handheld Module may be used by the cabin attendant to record inventory brought onboard or taken off the vehicle. The Cabin Server is the server for the other members of the vehicle-based domain storing both vehicle inventory and customer records. It provides a store and forward router function for email, credit card verification, and other Internet traffic. The Cabin Server includes a modem. If airborne, it may use an installed air phone system (Communications Link) to connect to a Ground Router. Otherwise it may use a cellular phone or other installed communications equipment as a Communications Link.

In addition to managing customer records, the Inventory & Services Server manages all inventory and provides analysis tools for both inventory and customer databases. It facilitates a three-tier store model that includes base level stores, terminal level stores, and vehicle level stores. The Inventory client uses a barcode reader for recording inventory additions, subtractions and movements among the various inventory stores.

BRIEF DESCRIPTION OF DRAWINGS

The foregoing aspects and many of the attendant advantages of this invention will become more readily appreciated as the same becomes better understood by reference to the following detailed description, when taken in conjunction with the accompanying drawings wherein.

DETAILED DESCRIPTION

Network Overview

Figure 1:
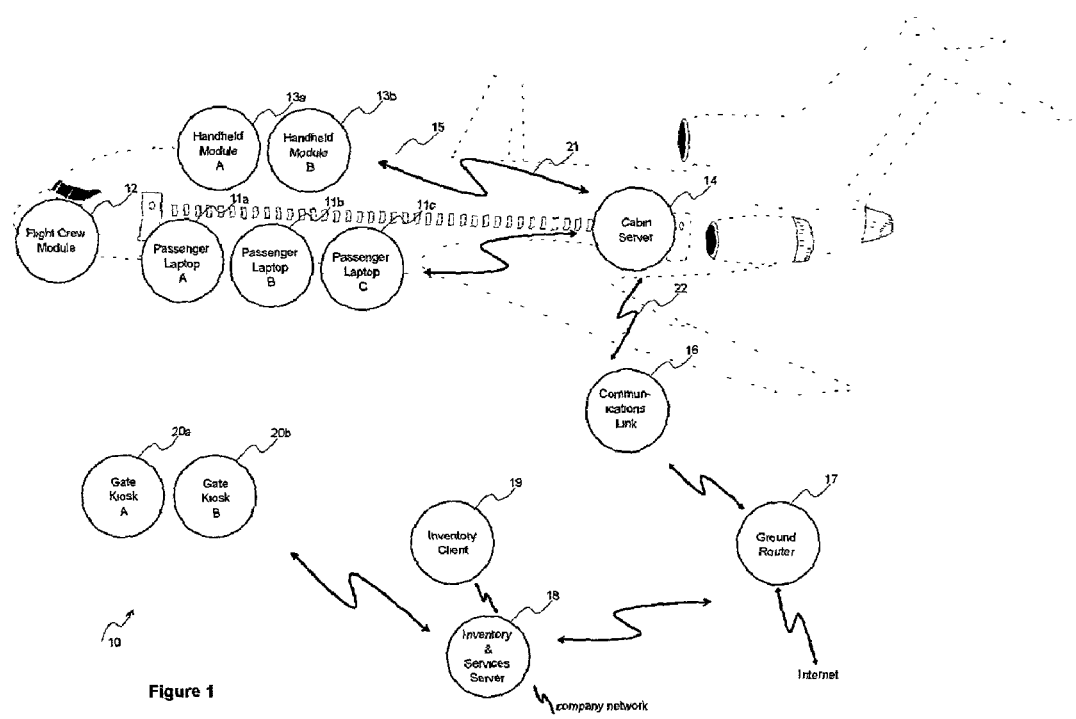
FIG. 1 is a schematic of a network for providing products and services to passengers and crew on a transport vehicle such as a commercial aircraft comprising a plurality of member computers.

A network of computers for providing products and services to passengers and crew on a transport vehicle is shown in FIG. 1, generally at reference numeral 10. Network 12 is shown in an exemplary fashion for a commercial aircraft comprising: 1) three member computers 11a through 11c called Passenger Laptops that are used by the passengers onboard a transport vehicle 15 to request and receive services, 2) a member computer 12, called a Flight Crew Module, that is used by the operator crew to request and receive services, 3) two member handheld computers 13a through 13b called Handheld Modules that are used by cabin attendants to manage the delivery of products and services to the passengers, 4) a computer server 14 for the vehicle-based domain called a Cabin Server, storing data, performing calculations, and acting as a communications gateway to other members in the network, 5) a communications link 16, 6) a ground router 17 for access to the Internet, 7) a computer server 18 for the ground-based domain called the Inventory & Services Server, managing product inventory and customer orders, 8) a computer for recording inventory 19 called an Inventory Client, and 9) two computer kiosks at departure and arrival ports called Gate Kiosks for passenger ordering.

The purpose of the network is to provide a wider range of products and services to the passenger more efficiently and with greater revenue potential.

The computers onboard the aircraft 15 are members of a Local Area Network (LAN) 21 and in the preferred form of the invention, the communications medium is a wireless Ethernet (RF Ethernet). The Passenger Laptop hardware 70 is a standard laptop computer or other portable Internet Appliance provided by the passenger and including a compatible RF Ethernet PCMCIA card 74. The Passenger Laptops (11*a,b,c*) are configured to participate in the network with software, hereinafter called Floppy Code, derived from the Gate Kiosk 20*a,b* or via the Internet. The Passenger Laptops simplify product delivery by eliminating the requirement for a cabin attendant to process the service requests. They also provide access to special products and services such as DVD movies and e-mail. Onboard the aircraft, the Passenger Laptop communicates only with the Cabin Server 14 and is identified by a unique host address that is associated with a particular seat number. The Floppy Code together with the installed Operating System (OS) comprises the Passenger Laptop code 110. Three primary functional capabilities are included: a capability to install and de-install the host address 111, a passenger service module 113 and a special e-mail reader 112. The passenger service module provides ordering status, submits new order requests to the Cabin Server and shows billing information. It is also the conduit of services that are resident on the Cabin Server 14. The e-mail reader is similar to standard commercial products except that it is extended to retrieve message sizes prior to upload and show a projected cost of uploading.

The Flight Crew module 12 is similar to the Passenger Laptop 11*a,b,c* except that the passenger service module 113 is tailored to the information requirements of the cockpit.

The Handheld Modules 13*a,b* are used by the cabin attendants to record inventory and manage services to passengers. They are unique hand held computers 30 that include a bar code reader 36 to support inventory management and a credit card reader 35 to initiate the cash-less transactions. The Handheld Modules include an RF Ethernet PCMCI card 34 to support network communications with the Cabin Server. The Handheld Module software 210 is comprised of two major modules. The module controlling passenger service 212 is functionally similar to the passenger service module 113 of the Passenger Laptop except that it is expanded to handle a plurality of customer records and the user interface is tailored to cabin attendant interaction. The inventory control function 211 is used as an inventory client of the Cabin Server inventory control module 313 and provides the capability to record inventory that is boarded or removed from the aircraft.

The Cabin Server hardware 40 is an off-the-shelf laptop or other portable personal computer with an RF Ethernet PCMCI card 44 just like the Passenger Laptop 70. The only additional hardware requirement is a modem 45 to support ground communication and sufficient memory and CPU speed to support any applications hosted on the Cabin Server. Cabin Server software 310 mirrors the architecture of the Handheld Device 210 with the server modules to support passenger service 312 and inventory control 313. It retrieves vehicle specific database information from the ground based Inventory & Services Server 18 and manages the customer database and inventory for the vehicle during the trip. It also has a store and forward router for TCP/IP communication with the ground 311. This router is unique in that packets may be accumulated until a physical link is established. Optimizing code determines the length and frequency of connections based on cabin demand.

The Communications Link 16 is an installed or installable communications capability such as an air phone for airborne operations and a cellular or other telephone for ground-based operations. It is able to access a Ground Router 17. The Ground Router may be part of the airline network allowing a more dedicated access between the airborne or vehicle-based Cabin Server 14 and the ground based Inventory & Services Server 18. The linkage between these two computers may be via the Internet.

The Inventory Client 19 is a handheld device for reading inventory bar codes and communicating inventory transfers to the Inventory & Services Server 18.

The Inventory & Services Server 18 handles order requests from the Gate Kiosks 20*a,b*, manages inventories at the fixed bases, and provides database analysis. It facilitates product distribution across the three tiers of the stores model. It is a standard computer server 50 with sufficient CPU power, memory, and storage capacity to support large databases of current and historical customer records in addition to all inventory data. The Inventory & Services Server software 410 is comprised of three primary modules. In addition to the two functional software modules for order control 413 and inventory control 412 is a functional capability to support data analysis and projection 411. Data warehouse architecture and the associated data mining software provides the metrics and predictive capability to project stock levels and product mix.

The Gate Kiosks 20*a,b* and equivalent capability provided over Internet allow customers to establish service and order products and services prior to departure time. It is a standard PC type computer hardened and encased to make it sufficiently robust for heavy public usage 60. The Gate Kiosk software 510 comprises two basic modules. The first initializes service and provides customer access for users of the Passenger Laptop 511. The second facilitates customer orders 512. A similar software architecture is tailored for Internet access and may be provided via the airlines' Internet web site. Customer access for the Passenger Laptop is provided by the Floppy Code that is delivered on a floppy diskette or other similar medium. The Floppy Code is modified to identify the particular customer and includes the appropriate host address. The software module for customer orders 512 allows the customer to pre-purchase various products. The range of products offered depends on how far in advance the customer executes this pre-purchase. If pre-purchase is via the Internet, the product range is determined by base stores and the logistics of positioning the product to the relevant terminal. If the order is made at the Gate Kiosk 20*a,b*, the product range is determined by stores at that terminal. And finally, product ordered on the aircraft is restricted to vehicle-level stores. When customers, with or without Passenger Laptops initiate a dialogue with the Gate Kiosk software 510, a customer record is created on the Inventory & Services Server and the credit card information is pre-verified.

Passenger Laptop Member

The Passenger Laptop 11*a,b,c* is a component in the airborne or vehicle-based domain of the network and it communicates directly only with the Cabin Server 14. However, data is transferred indirectly from the Gate Kiosk 20*a,b*, or equivalent Internet software by way of a floppy diskette that also contains all Passenger Laptop software 110 except the installed Operating System (OS) 114. The purpose of the Passenger Laptop member is two fold: 1) to provide customers with a more direct means of requesting and monitoring the delivery of products and services, and 2) to facilitate delivery of special new services. Many passengers already spend a significant amount of their travel time interacting with a laptop. Therefore, the means to engage the customer is already in place and it is the customers preferred vehicle of communication. The Passenger Laptop will support a wide range of services today as well as many more that will be defined in the future and in this invention, the cost is born by the customer.

The following typical scenario demonstrates the functional context within the overall network. In the time frame of making an advance reservation, the user accesses the airline web site, confirms the use of his/her credit card to procure services and selects from a wide range of products including perhaps the compatible RF Ethernet PCMCI card. The user may elect to download the Floppy Code or use the software previously installed on his/her machine. The reservation data configures the Floppy Code for use onboard and the user is ready to receive pre-selected products and services without making any further request to the cabin attendant. On board the initialization sequence displays the requested services. If the user delays pre-ordering until reaching the gate, services may be ordered via the Gate Kiosk 20a,b, using a credit card or debit "phone" card. The Gate Kiosk can update an existing floppy diskette with Floppy Code or dispense a new one. If pre-ordering at the gate is not possible, a floppy diskette containing Floppy code is provided by the cabin attendant after boarding. During the trip, the user signals requests for further services, monitors delivery and cost while continuing to use the laptop for work or entertainment. If the user wishes to receive e-mail he/she may interrogate the POP3 server for headers and file sizes, augmented with estimated cost, prior to transfer.

Figure 2:
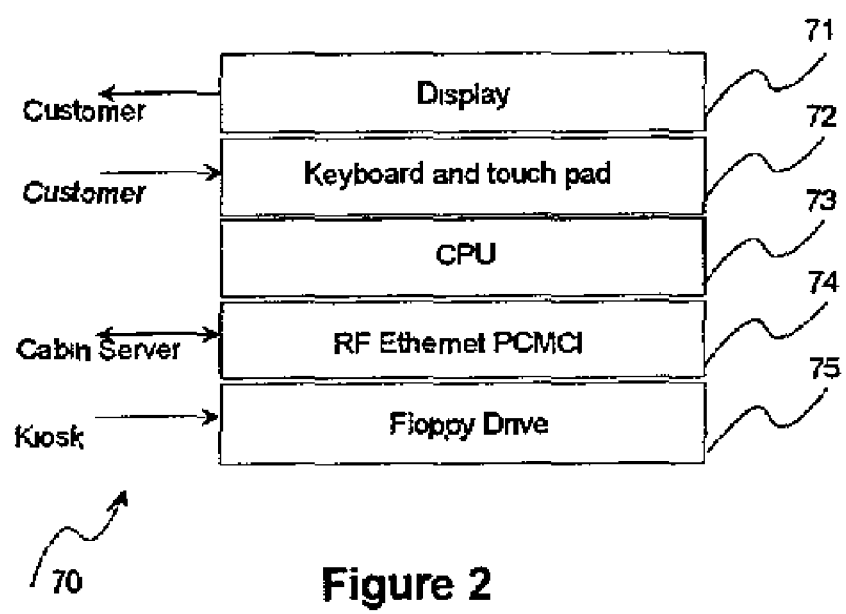
FIG. 2 is a schematic block diagram of the Passenger Laptop and/or Flight Crew Module showing the essential hardware components.

The hardware configuration 70 of the Passenger Laptop 11a,b,c in this preferred embodiment of the present invention is shown in FIG. 2. The device is a standard laptop computer with an RF Ethernet PCMCI card 74 and a floppy diskette drive 75. The user interacts with the display, keyboard and pointing devices in the usual way, the floppy diskette drive supports loading of Floppy Code which together with the installed OS comprises the Passenger Laptop code 110. The RF Ethernet PCMCI supports communication with the Cabin Server 14. The RF Ethernet card operates in the Industrial, Scientific, and Medical (ISM) spectrum and meets FCC requirements. In the case of air transport usage, approval is granted by the air transport operator and restrictions would likely include the widely adopted restrictions on the use of portable electronic equipment during takeoff and landing.

Figure 7A:
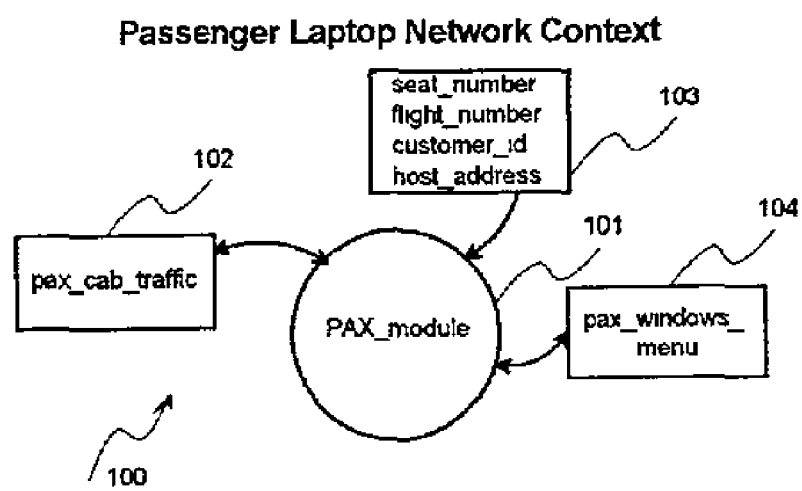
FIG. 7a is a Context diagram of the Passenger Laptop and the network of the present invention.

FIG. 7a the Passenger Laptop Network Context diagram 100 illustrates the external information flow to other members of the network and the user. Flow from block 103 represents the reservation information and host address that is imported with the Floppy Code on a floppy diskette or is accessed by the user over the Internet. The input and output flow indicated in block 104 pax_windows_menu is the user interface via the Graphical User Interface (GUI) provided with the installed OS. The input and output flow indicated in block 102 pax_cab_traffic is the communication with the Cabin Server 14.

Figure 7B:
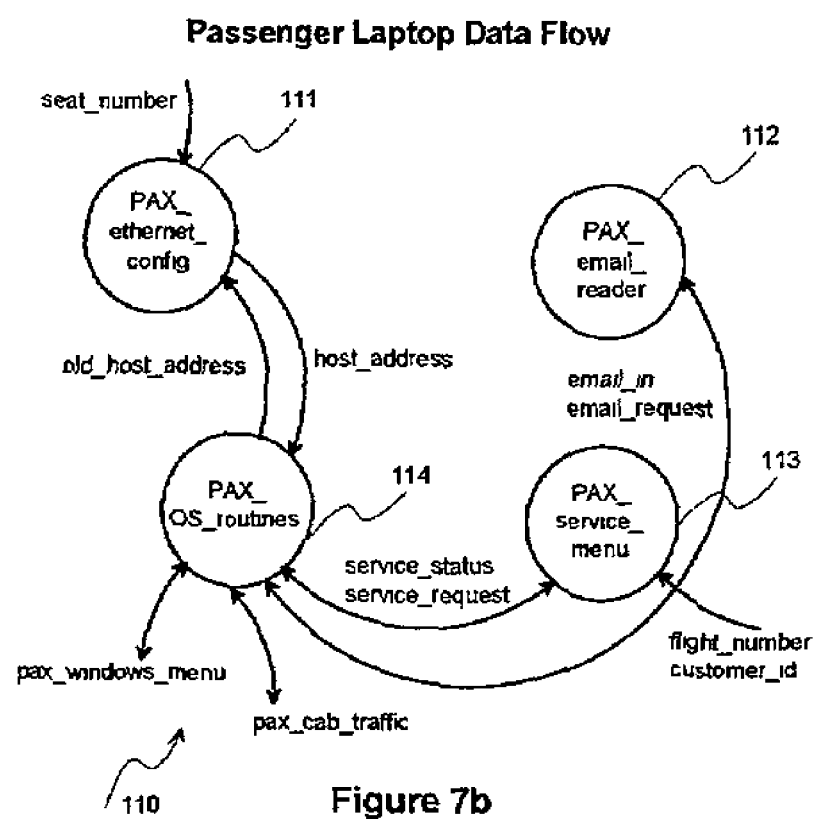
FIG. 7b is Data Flow diagram of the essential software components of the Passenger Laptop.

In FIG. 7b the Passenger Laptop Data Flow diagram 110 illustrates software architecture and data flow of the preferred embodiment. The software comprises three basic modules in addition to the installed OS 114 called PAX_OS_routines that provide the GUI, Internet Browser, and the network transfer functionality.

Figure 12A:
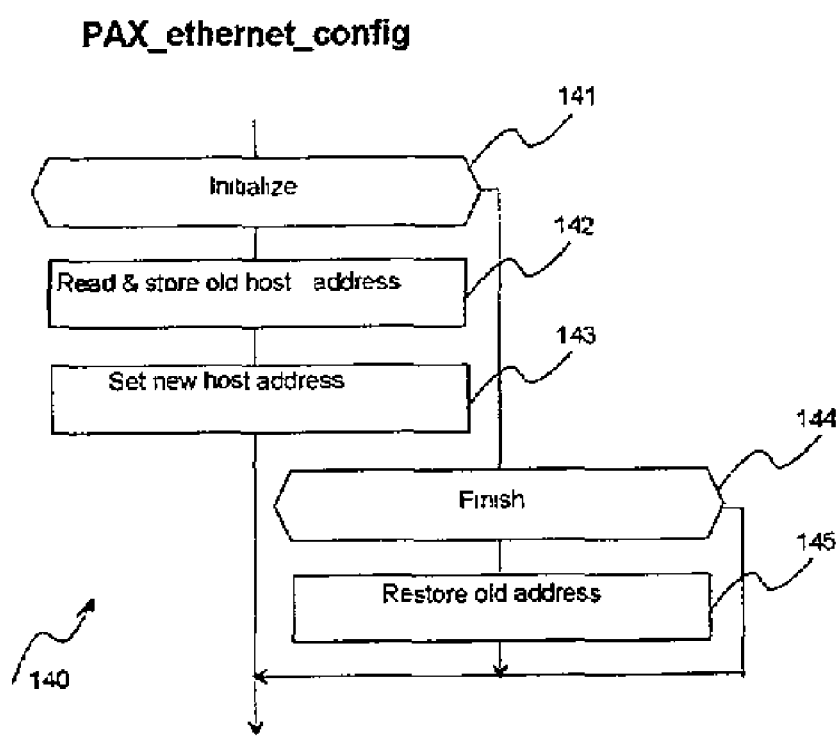
FIG. 12a is flow chart illustrating the logic of the software module for reconfiguring the host address of the Passenger Laptop (PAX_ethernet_config)

The module called PAX_ethernet_config 111 saves and restores the current host address, which in the preferred embodiment of the current invention is the Internet Protocol (IP) address. A new host address for the purposes of the trip is created that associates the Passenger Laptop with a seat location and customer record. As the resident OS routines 114 are used to facilitate the change of IP address and provide the network transfer functionality for the other modules, FIG. 7b shows the flow of this data between the modules PAX_ethernet_config 111 and PAX_OS_routines 114. The logic for PAX_ethernet_config 140 is illustrated in FIG. 12a and shows that saving the current host address and installing the new address 142, 143 is accomplished when the user initializes his system onboard 141 and the old address is restored 145 at completion of the trip 144.

Figure 12B:
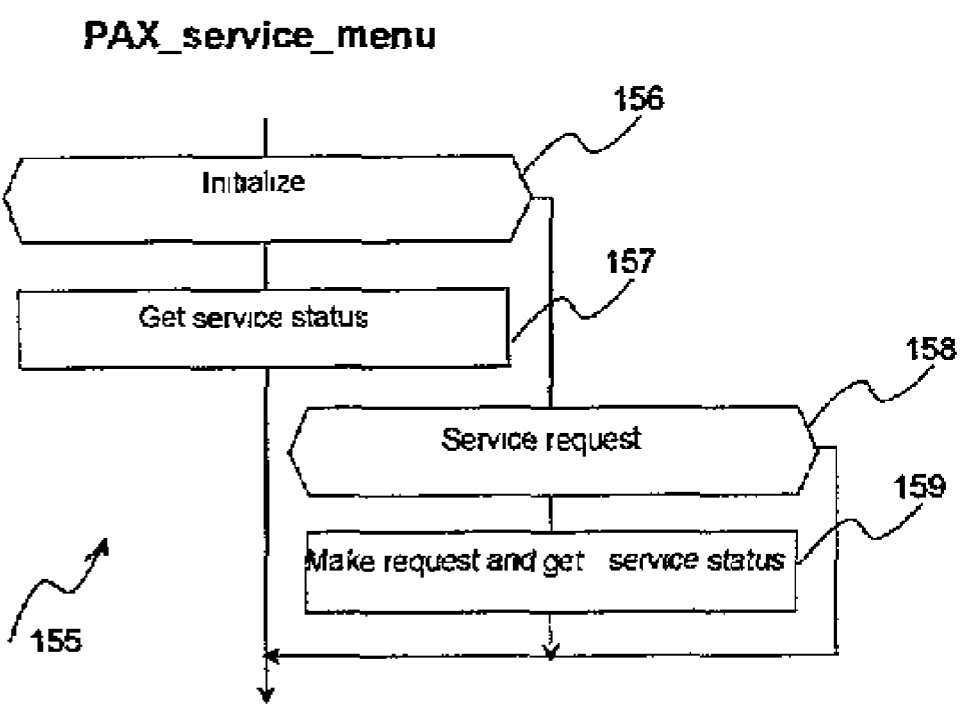
FIG. 12b is flow chart illustrating the logic of the software module for monitoring services and requesting new services in the Passenger Laptop (PAX_service_menu)

The module called PAX_service_menu 113 provides the functionality to manage service. It provides the menus to show the status of current requests and cost data together with the interface to make new service requests. The installed OS routines 114 provide the conversion to viewable information, pax_windows_menu or network information pax_cab_traffic. The logic for PAX_service menu 155 is illustrated in FIG. 12b and reflects the option of requesting service 158 where status and cost data are returned 159 by the Cabin Server 14 and the option of initializing new requests 156 where new service may be established or credit card information verified 157 by the Cabin Server.

Figure 12C:
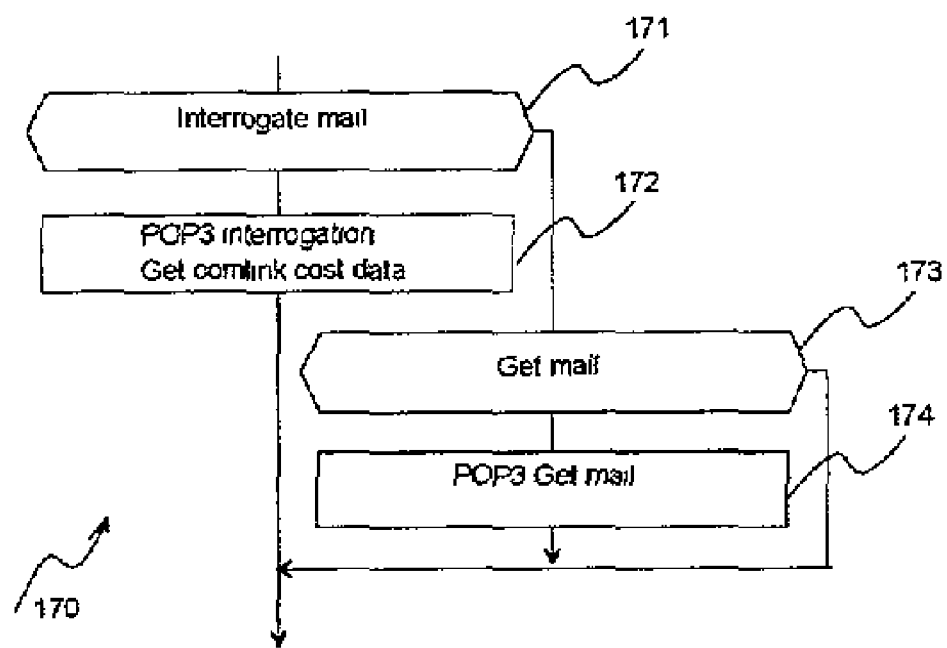
FIG. 12c is flow chart illustrating the logic of the software module for reading email in the Passenger Laptop (PAX_email_reader)

The module called PAX_email_reader 112 extends commercially available e-mail reader functionality by allowing the user to interrogate the POP3 server for message headers and message sizes prior to transferring the messages. The reader also interrogates the Cabin Server 14 for transfer costs. The installed OS routines 114 provide the conversion to viewable information, pax_windows_menu or network information pax_cab_traffic. The logic for PAX_email_reader 170 is illustrated in FIG. 12c and reflects two options. If interrogating the POP3 server for message headers only 171, the headers are returned with cost data 172. If requesting download of the full message 173, a standard mail request is issued 174.

Handheld Module Member

The Handheld Module 13a,b is a component in the airborne or vehicle-based domain of the network and it communicates directly only with the Cabin Server 14. The purpose of the Handheld Module is two fold: 1) to provide a more efficient means of delivering products and services to users, and 2) to record inventory that is boarded or removed from the aircraft. The Handheld Module is a hand held computer that is specially designed for optimal usage by the cabin attendants. It features easy one-handed entry and has a menu structure that allows ready access to passenger data. The device will not only allow more efficient management of product and service delivery using conventional procedures but will allow new more efficient onboard procedures for service distribution.

The following typical scenario demonstrates the functional context within the overall network. In the time frame of making an advance reservation, the user without a laptop accesses the airline web site, confirms the use of his/her credit card to procure services and selects from a wide range of products. If the user delays pre-ordering until reaching the gate, services may be ordered via the Gate Kiosk 20a,b, using a credit card or debit "phone" card. In both of these cases the passenger is ready to receive pre-selected products and services without making any further request to the cabin attendant. If pre-ordering is not possible, the passenger may initiate service with the cabin attendant after boarding. At this time, the passenger's credit card may be read using the Handheld Module and customer record is established with the initial order. During the trip, the passenger makes requests for further services to the cabin attendant who records the requests with the Handheld Module. At the end of the trip a receipt for services is provided to each passenger not having a Passenger Laptop. The cabin attendant uses Handheld Module during the trip to manage distribution of the ordered products and services and record delivery to all passengers including those with Passenger Laptops. The cabin attendant may user the bar code reader in the process of dispensing products or taking orders.

Figure 3:
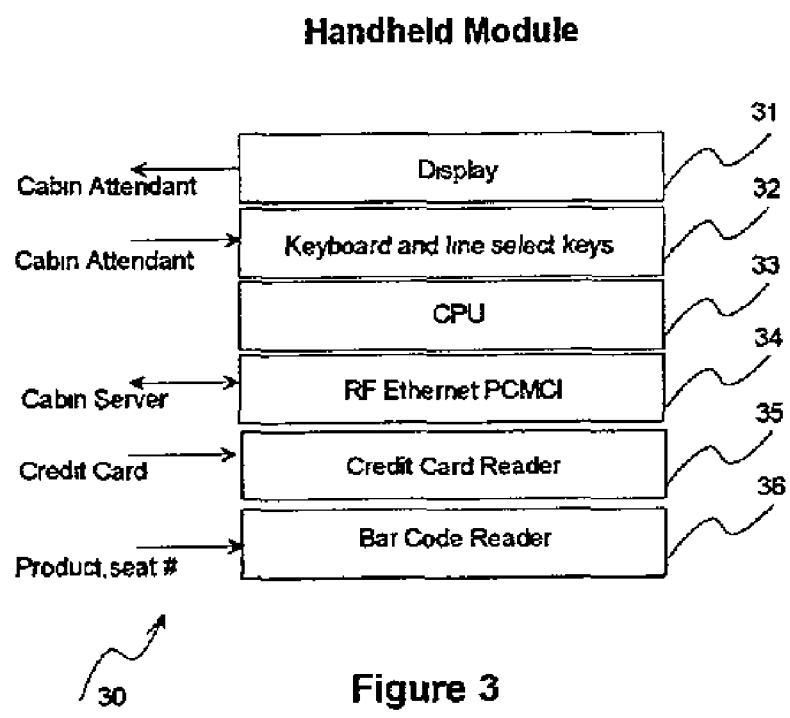
FIG. 3 is a schematic block diagram of the Handheld Module showing the essential hardware components.

The hardware configuration 30 of the Handheld Module 13a,b in this preferred embodiment of the present invention is shown in FIG. 3. The device is a special purpose hand held computer with an RF Ethernet PCMCI card 34, a credit card reader 35, and a bar code reader 36. The user interacts with the display 31, keyboard and line select keys 32 in the usual way The RF Ethernet PCMCI 34 supports communication with the Cabin Server 14. The RF Ethernet card operates in the Industrial, Scientific, and Medical (ISM) spectrum and meets FCC requirements. In the case of air transport usage, approval is granted by the air transport operator and restrictions would likely include the widely adopted restrictions on the use of portable electronic equipment during takeoff and landing.

Figure 8A:
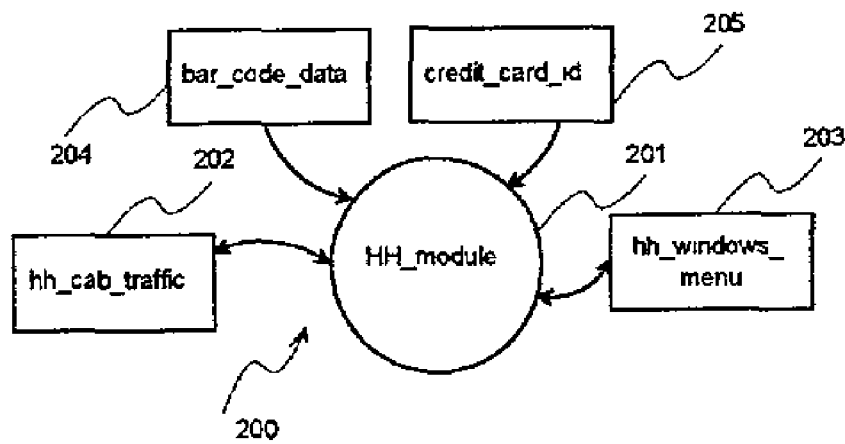
FIG. 8a is a Context diagram of the Handheld Module and the network of the present invention.

In FIG. 8a the Handheld Module Network Context diagram 200 illustrates the external information flow to other members of the network and the user. Flow from blocks 204 and 205 represent the scanned bar code and credit card data. The input and output flow indicated in block 203 hh_windows_menu is the user interface via the Graphical User Interface (GUI) provided with the OS. The input and output flow indicated in block 202 hh_cab_traffic is the communication with the Cabin Server 14.

Figure 8B:
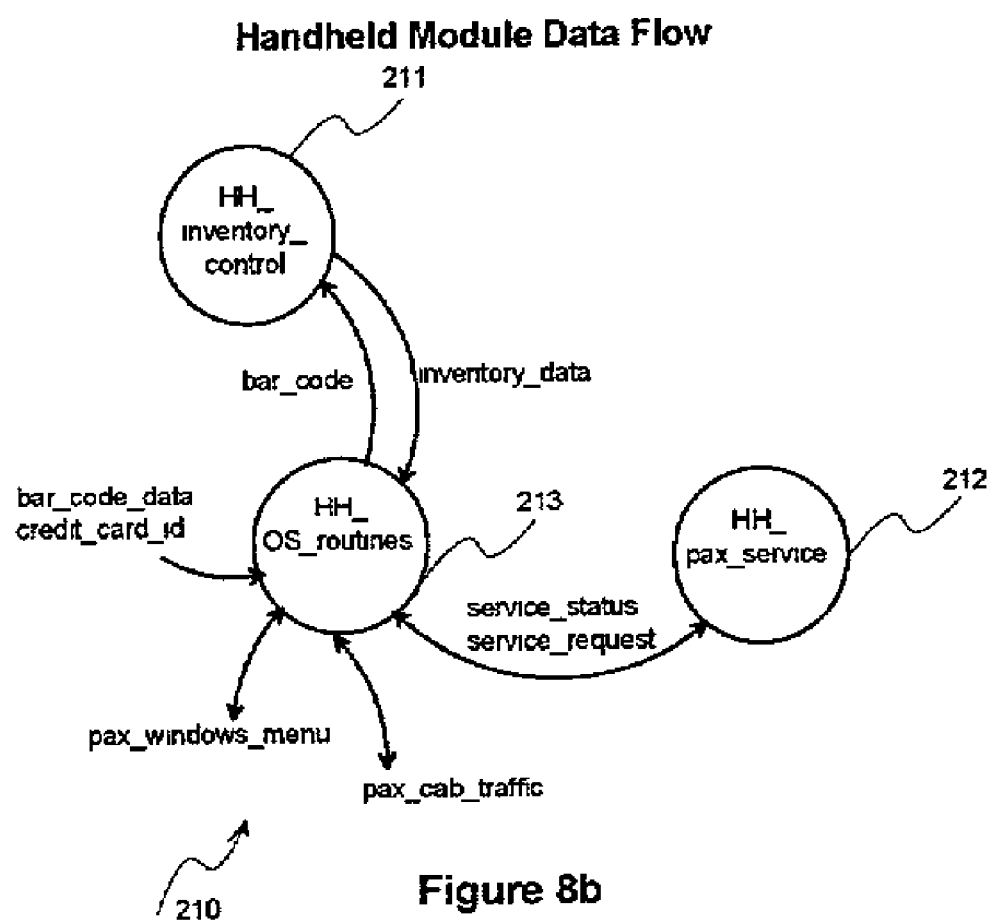
FIG. 8b is Data Flow diagram of the essential software components of the Handheld Module.

In FIG. 8b the Handheld Module Data Flow diagram 210 illustrates software architecture and data flow of the preferred embodiment. The software comprises three basic modules in addition to the OS 213 called HH_OS_routines that provide the GUI and the network transfer functionality.

Figure 13A:
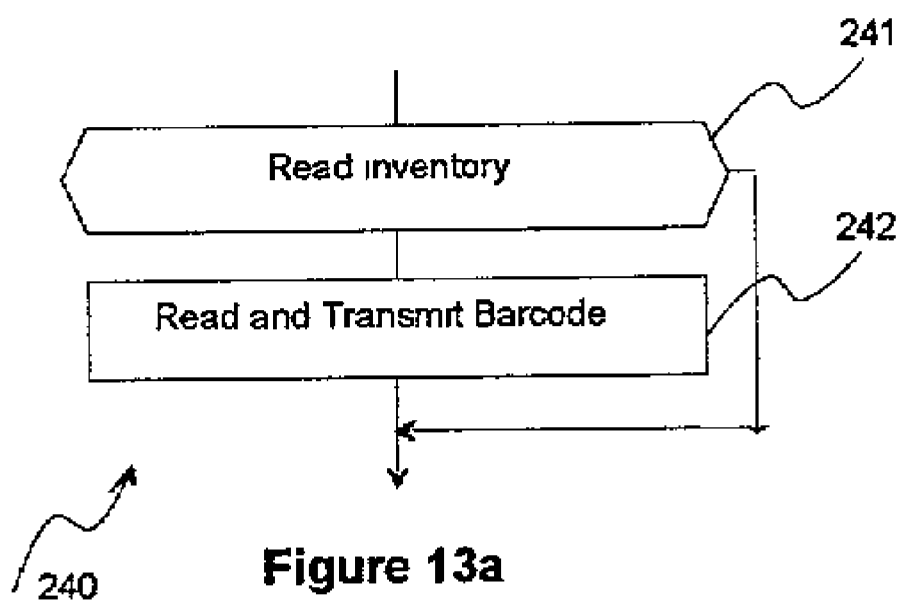
FIG. 13a is flow chart illustrating the logic of the software module for recording inventory in the Handheld Module (HH_inventory_control)
Figure 13B:
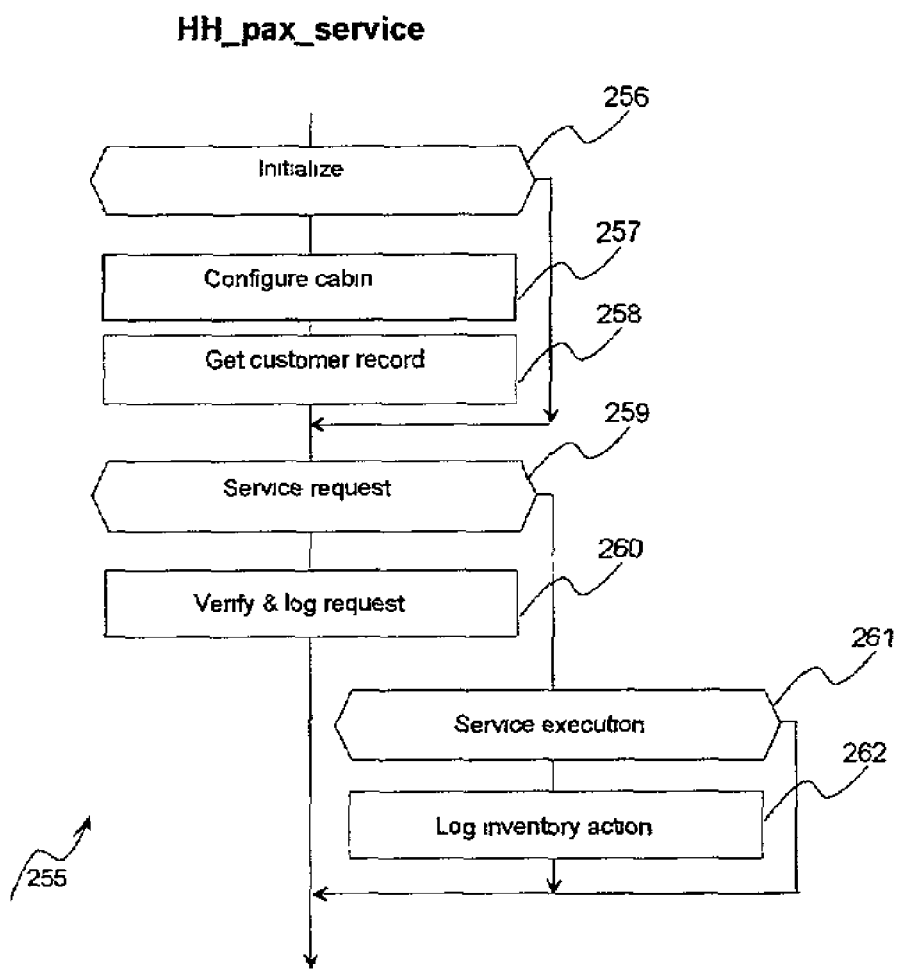
FIG. 13b is flow chart illustrating the logic of the software module for managing delivery of passenger services in the Handheld Module (HH_pax_service)

The module called HH_pax_service 212 provides the functionality to manage service. It provides the menus to show the status of current requests and cost data for each passenger together with the interface to make new service requests. The OS routines 213 provide the conversion to viewable information, pax_windows_menu or network information pax_cab_traffic. They also provide include the drivers for the bar code and credit card readers accepting bar_code_data and credit_card_id. The logic for HH_pax_service 255 is illustrated in FIG. 13b. In the initialization mode 256 the cabin attendant may configure the system to operate in only a part of the cabin and may specify other display options 257,258. Service requests, including credit card verifications 259 communicate with the Cabin Server 14 to update the status 260. As service is provided 261 the customer record on the Cabin Server is similarly updated and the available inventory adjusted 262.

The module called HH_inventory_control 211 provides the functionality to operate as a conventional inventory client, recording and transmitting bar codes to the Cabin Server 14. It provides the menus to show the status of current operation. The OS routines 213 provide the conversion to viewable information, pax_windows_menu or network information pax_cab_traffic. They also provide include the drivers for the bar code readers accepting bar_code_data. The logic for HH_inventory_control 240 is illustrated in FIG. 13a. In the inventory mode 241 bar code input causes communication with the Cabin Server 14 to update inventory 242.

Cabin Server Member

The Cabin Server 14 is the server for other members in the airborne or vehicle-based domain of the network and is the gateway to the ground domain. It communicates with the Passenger Laptops 11a,b,c and the Handheld Modules 13a,b in the vehicle and with the Ground Router 17 on the ground via the Communications Link 16. The purpose of the Cabin Server is four fold: 1) it is the server for the two vehicle-based clients that deliver products and services to users, i.e. the Passenger Laptop and the Handheld Module, 2) it manages inventory and acts as the inventory server for the vehicle-based client that records inventory boarded or removed from the aircraft, i.e. the Handheld Module, 3) it is a client of the ground-based Inventory & Services Server 18, and 4) it is the gateway router for passenger Internet communication. The Cabin Server features a user interface that allows cabin attendants to monitor and control the efficient management of product and service delivery from the galley area.

The following typical scenario demonstrates the functional context within the overall network. After the pre-ordered products and aircraft level stores are boarded while the aircraft or vehicle is at the gate, the cabin attendant scans the bar code(s) of the boarded inventory to update the Cabin Server 14 inventory data. A pre-departure trip initialization uploads customer records and reported inventory from the Inventory & Services Server 18 that is then verified with the actual inventory. Credit card information is re-verified for any customer records older than a specified time. The Communication 16 Link on the ground may be a cellular phone connection or other ground communication link. After the trip initialization the Cabin Server updates any Passenger Laptops 11a,b,c or Handheld Modules 13a,b on the network and subsequently updates any that join the network. During the trip, any requests for a new customer record may involve verification of credit card data via the Communications Link. New requests for products and services are recorded in the customer database and inventory is appropriately allocated. Clients are updated continuously. As delivery of products and services is executed the vehicle inventory data is appropriately depleted and credit card transactions transmitted to the ground domain. Prior to arrival a hardcopy receipt is provided to the appropriate passengers. The Communication link while airborne is an "air phone" or other air/ground communications device. At the end of the trip cabin attendants use the inventory client, i.e. the Handheld Module to verify actual inventory off loaded. The inventory data and updated customer records are sent to the Inventory & Services Server.

Figure 4:
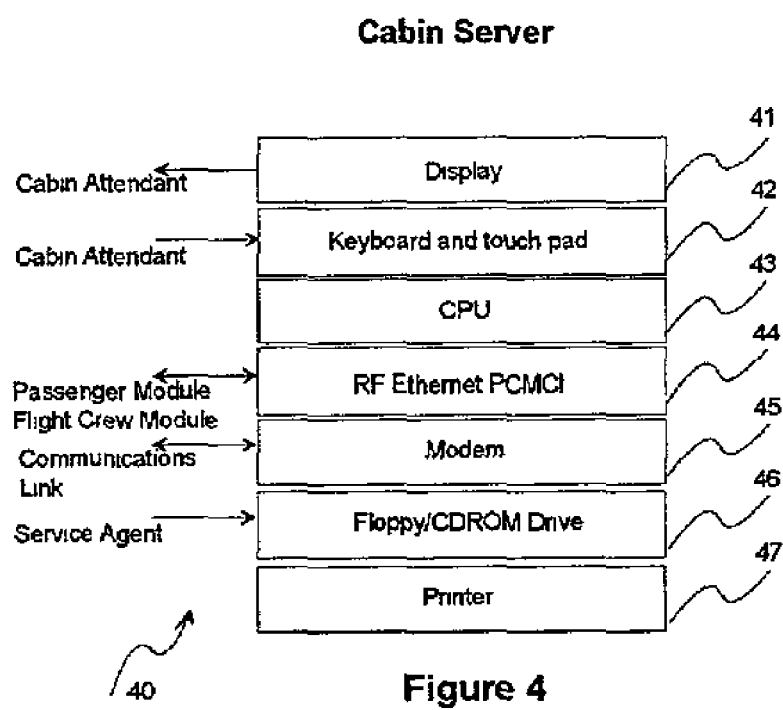
FIG. 4 is a schematic block diagram of the Cabin Server showing the essential hardware components.

The hardware configuration 40 of the Cabin Server 14 in this preferred embodiment of the present invention is shown in FIG. 4. The device is a standard laptop computer or other small portable computer with an RF Ethernet PCMCI card 44, a modem 45, a CDROM/floppy diskette drive 46, and a portable printer 47. The user interacts with the display, keyboard and pointing devices in the usual way, the CDROM/floppy diskette drive supports loading of the operational code which together with the installed OS comprises the Cabin Server code 310, and the RF Ethernet PCMCI supports communication with the Passenger Laptops 11a,b,c and the Handheld Modules 13a,b. The RF Ethernet card operates in the Industrial, Scientific, and Medical (ISM) spectrum and meets FCC requirements. In the case of air transport usage, approval is granted by the air transport operator and restrictions would likely include the widely adopted restrictions on the use of portable electronic equipment during takeoff and landing.

Figure 9A:
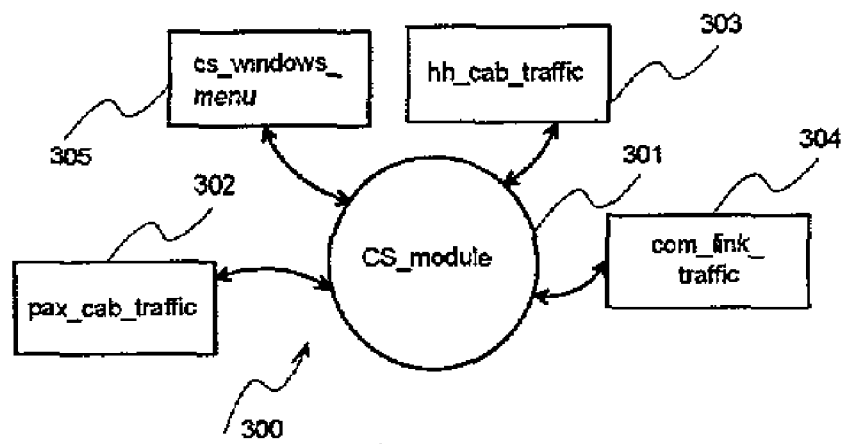
FIG. 9a is a Context diagram of the Cabin Server and the network of the present invention.

In FIG. 9a the Cabin Server Network Context diagram 300 illustrates the external information flow to other members of the network and the user. The input and output flow indicated in block 305 cs_windows_menu is the user interface via the Graphical User Interface (GUI) provided with the installed OS. The input and output flow indicated in block 303 hh_cab_traffic is the communication with the Handheld Modules 13a,b. The input and output flow indicated in block 302 hh_pax_ traffic is the communication with the Passenger Laptops 11a,b,c. The input and output flow indicated in block 304 com_ link_traffic is the communication carried by the Communications Link 16 to the Ground Router 17.

Figure 9B:
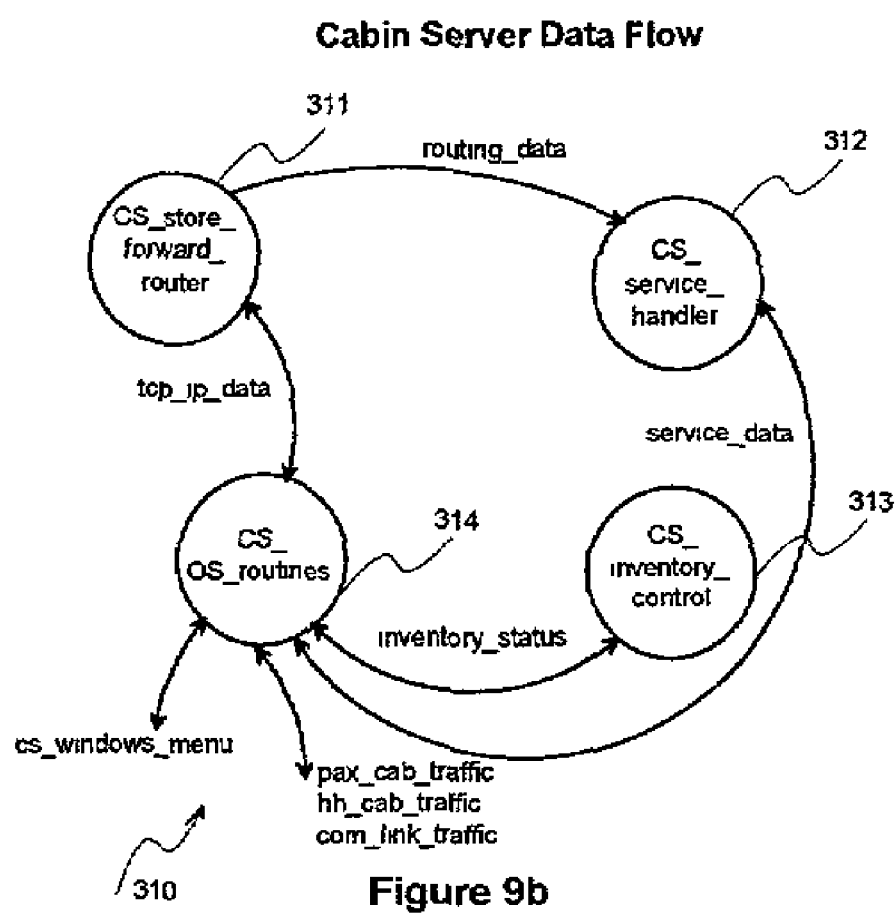
FIG. 9b is Data Flow diagram of the essential software components of the Cabin Server.

In FIG. 9b the Cabin Server Data Flow diagram 310 illustrates software architecture and data flow of the preferred embodiment. The software comprises three basic modules in addition to the OS 314 called CS_OS_routines that provide the GUI and the network transfer functionality.

Figure 14A:
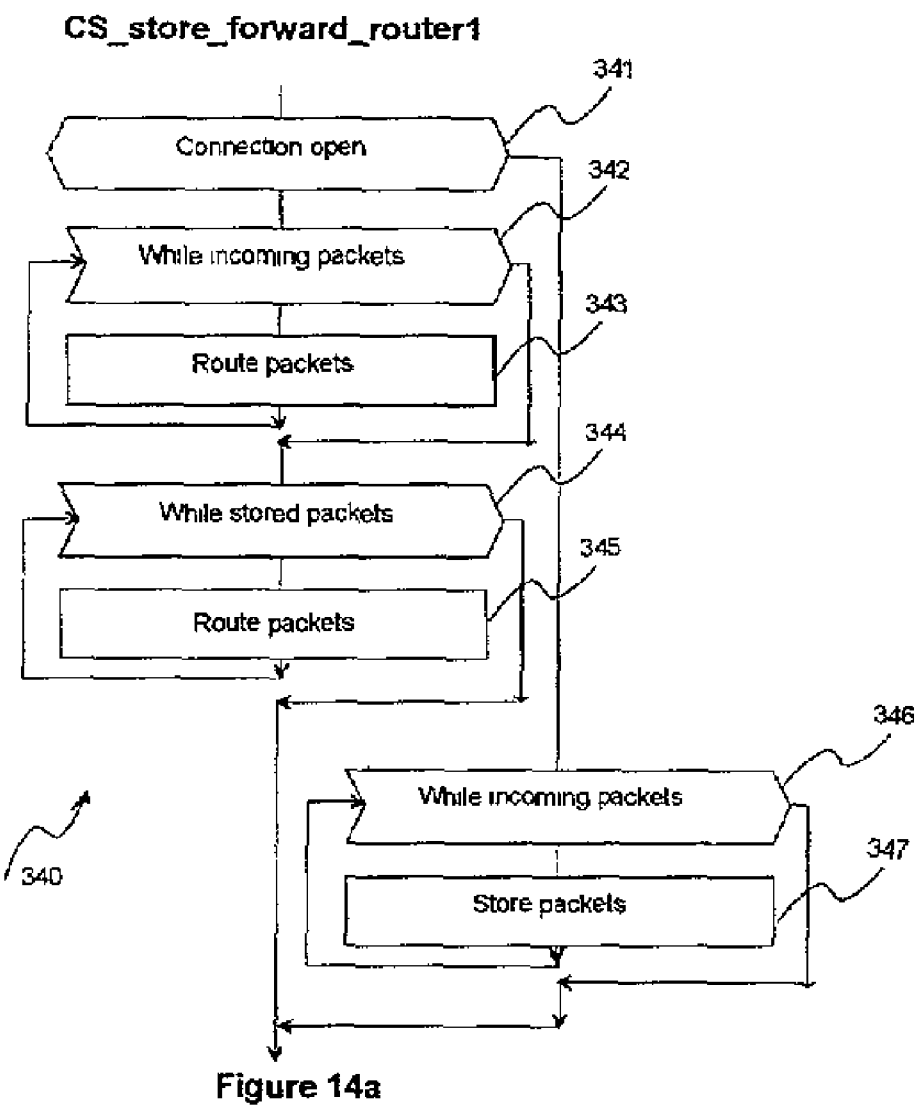
FIG. 14a is flow chart illustrating one thread of logic of the software module for storing and forwarding TCP/IP packets in the Cabin Server (CS_store_&_forward_router1)
Figure 14B:
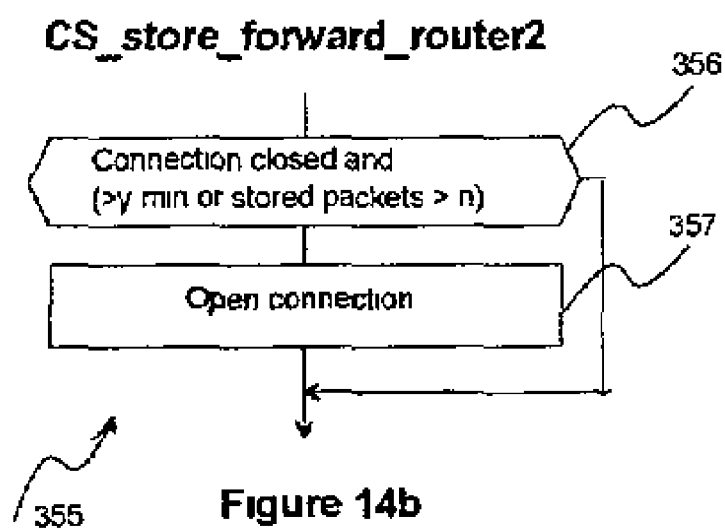
FIG. 14b is flow chart illustrating one thread of logic of the software module for connecting to the Communication Link in the Cabin Server (CS_store_&_forward_router2)

The module called CS_store_forward_router 311 is the vehicle-based gateway and router for, transmitting and receiving IP packets for the Cabin Server 14 or the Passenger Laptop 11*a,b,c*. In the receive mode the module acts as a conventional router, however in the send mode the routing is augmented with the store and forward features of the preferred embodiment of this invention. The OS routines 314 provide the vehicle network information pax_cab_traffic, as well as communication with the ground, com_link_traffic. The logic for CS_store_forward_router is shown as two threads CS_store_forward_router1 340 and CS_store_forward_router2 355 as illustrated in FIG. 14*a* and FIG. 14*b*. In the first thread, if the connection to the Communications Link 16 is established 341 then any incoming packets from the Passenger Laptops 11*a,b,c* or any other Cabin Service module are routed 343 and then any stored packets are routed 345. If a connection to the Communications Link is not established 346 then any incoming packets from the Passenger Laptops or any other Cabin Service Module are stored until a connection is established 347. The second thread of operation establishes a connection with the Communications Link 357 any time there is a sufficient number of packets or there are any packets and a sufficient time has elapsed 356.

Figure 14C:
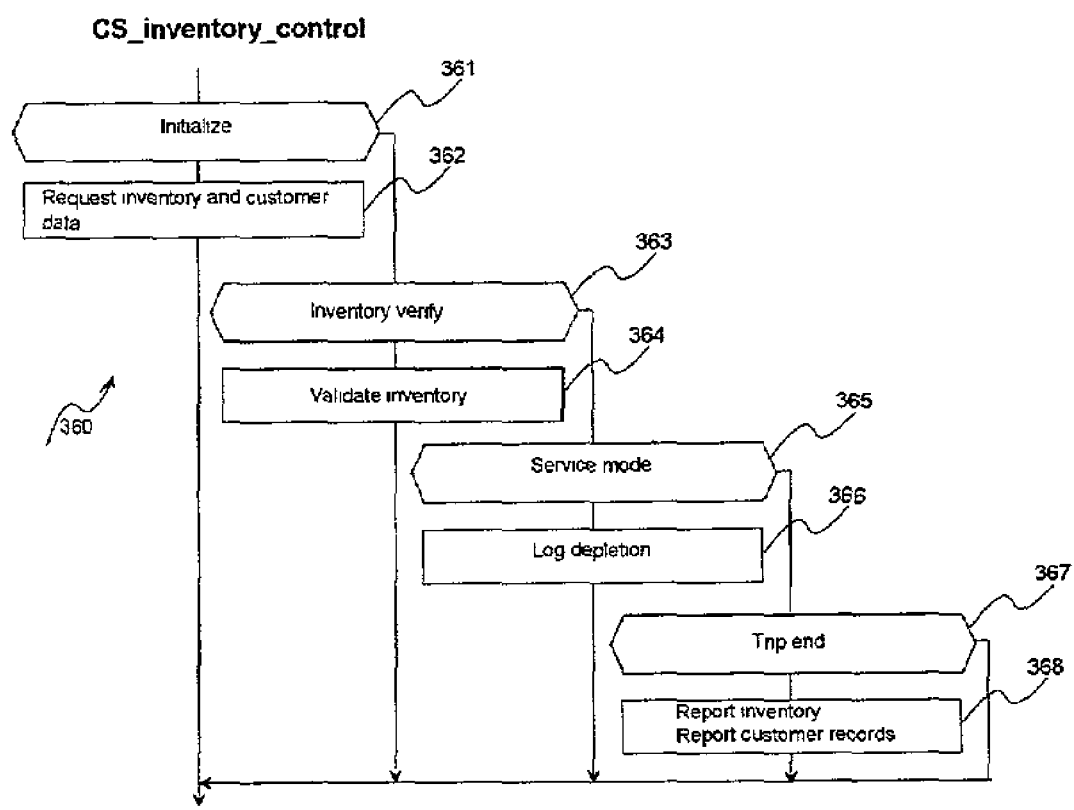
FIG. 14c is flow chart illustrating the logic of the software module for managing aircraft inventory in the Cabin Server (CS_inventory_control)

The module called CS_inventory_control 313 is the vehicle-based inventory server, receiving transmitted bar codes from the Handheld Modules 13*a,b*. The module also manages vehicle-based inventory: verifying boarded inventory with reported inventory from the Inventory & Services Server 18; allocating inventory as a result of requests from the Passenger Laptops 11*a,b,c* and Handheld Modules; and depleting inventory as a result of product delivery reported with the Handheld Modules. It provides the menus to show the status of current operation. The OS routines 314 provide the conversion to viewable information, cs_windows_menu, vehicle network information pax_cab_traffic and hh_cab_traffic, as well as communication with the ground, com_link_traffic. The logic for CS_inventory_control 360 is illustrated in FIG. 14*c*. In the initialize mode 361 customer data and planned inventory is uploaded from the Inventory & Services Server 362. In the verify mode 363, bar codes are received from the Handheld Modules and verified 364. In the service mode 365, allocation and depletion are reported to the Passenger Laptops and Handheld Modules 366. In the post trip mode 367, residual inventory is reported to the Inventory & Services Server 368.

Figure 14D:
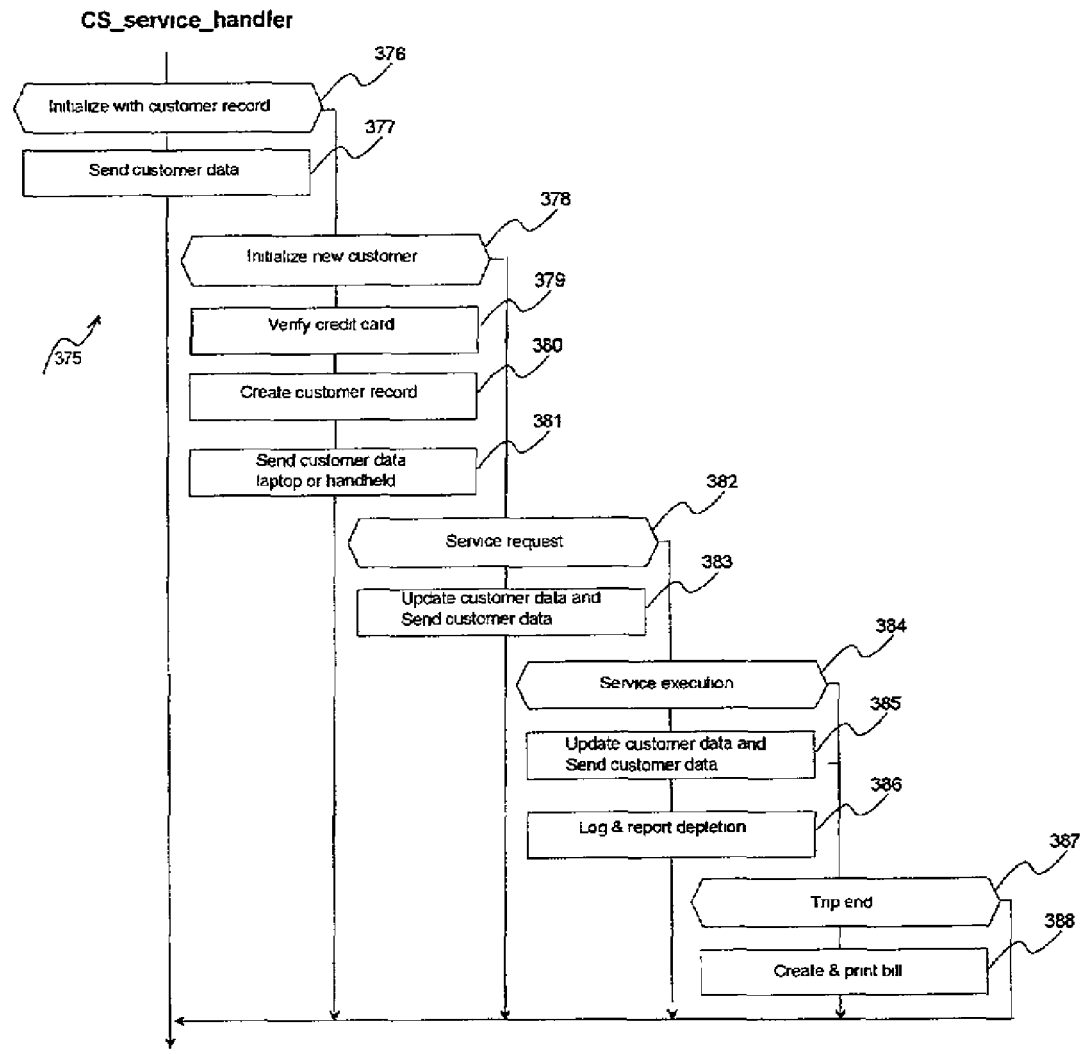
FIG. 14d is flow chart illustrating the logic of the software module for handling customer service requests in the Cabin Server (CS_service_handler)

The module called CS_service_handler 312 is the vehicle-based service server for the Handheld Modules 13*a,b* or the Passenger Laptops 11*a,b,c* in the preferred embodiment of this invention. The OS routines 314 provide the vehicle network information pax_cab_traffic and hh_cab_traffic. The logic for CS_service_handler 375 is illustrated in FIG. 14*d*. In the initialize mode 376 customer data uploaded from the Inventory & Services Server is sent to the Passenger Laptops 11*a,b,c* and the Handheld Modules 13*a,b*. When additional Passenger Laptops or Handheld Modules join the network 378 credit card data is verified, a customer record is created and the record status sent back to the Passenger Laptop and/or the Handheld Modules 379-381 If a service request is received from a Passenger Laptop or Handheld Module 382, The inventory is checked, the customer record is updated and the record status sent back to the Passenger Laptop and/or the Handheld Modules 383. Similarly, when service is executed as communicated by the cabin attendant using the Handheld Module 384, the inventory is depleted, credit card transactions are executed, the customer record is updated, and the record status sent back to the Passenger Laptop and/or the Handheld Modules 385, 386. Finally, at the end of the trip 387, a hard copy receipt is created for each appropriate customer 388.

Inventory & Services Server Member

The Inventory & Services Server 18 is the server component in the ground-based domain of the network. It communicates with the Gate Kiosks 20*a,b*, the Inventory Client 19, and the Cabin Server 14 in the vehicle via the Ground Router 17 and the Communications Link 16. The purpose of the Inventory & Services Server is three fold: 1) it manages customer records and is the customer service server for the ground-based Gate Kiosk (or similar Internet software) clients and the vehicle-based Cabin Server client, 2) it manages inventory and acts as the inventory server for the ground-based Inventory Client 19 that records inventory added to or transferred among the various stores, and the vehicle-based Cabin Server, 3) it provides a data warehouse architecture and implements data mining and other data analyses. The Inventory & Services Server is also a member of the airline or other company network so that the analysis and Gate Kiosk functions may be distributed within the company and on the Internet as appropriate.

The following typical scenario demonstrates the functional context within the overall network. Three levels of stores support the network operation. Base level stores located at hub locations stock the full range of products. Terminal level stores located at departure locations stock a subset appropriate to the location and are dynamically augmented to fulfill specific customer orders. Vehicle level stores are a subset of Terminal level stores and are appropriate to a particular trip. They are also dynamically augmented to fulfill specific customer orders. Prior to departure the Inventory Client 19 is used in conjunction with inventory control software on the Inventory & Services Server 18 to move inventory from Base level stores to Terminal level stores and subsequently to create a vehicle package comprising standard Vehicle level stores plus pre-ordered product. Of course, the Inventory Client is also used in normal replenishment and for taking stock. Following the trip a reverse process returns unused product to inventory. The Inventory & Services Server provides database management of inventory at all stores levels. As a result of the pre-ordering via the Gate Kiosks or equivalent Internet software, customer records are generated that support the dynamic movement of inventory onto the vehicle. The Inventory & Services Server also provides database management of customer records generated on the ground and those reported from the vehicle. Prior to departure the vehicle requests that relevant customer records be transferred for local management. These databases support offline analysis to predict buying patterns and determine both the range of products and procurement strategies.

Figure 5:
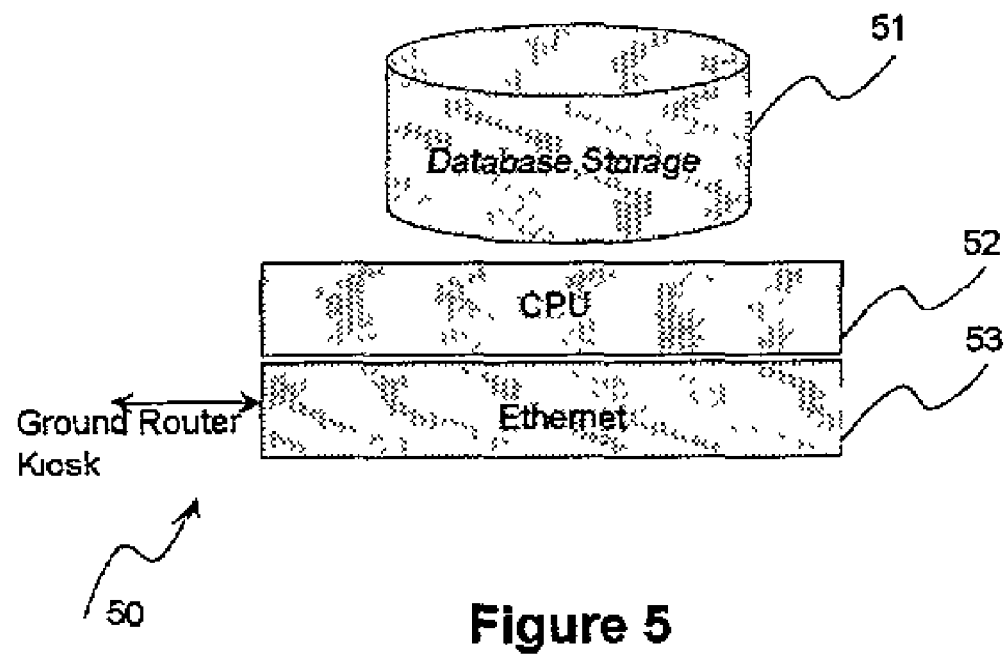
FIG. 5 is a schematic block diagram of the Inventory & Services Server showing the essential hardware components.

The hardware configuration 50 of the Inventory & Services Server 18 in this preferred embodiment of the present invention is shown in FIG. 5. The device is a commercially available computer server with network capability 53 and sufficient storage 51 to support the data warehouse requirements. A CDROM/floppy diskette drive may be available to support loading of the operational code which together with the installed OS comprises the Inventory & Services Server code 410.

Figure 10A:
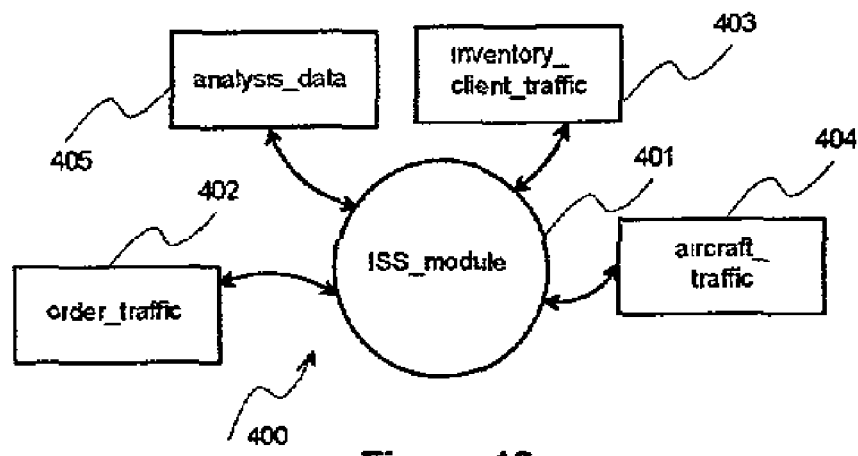
FIG. 10a is a Context diagram of the Inventory & Services Server and the network of the present invention.

In FIG. 10*a* the Inventory & Services Server Network Context diagram 400 illustrates the external information flow to other members of the network and the user. The input and output flow indicated in block 402 order_traffic is the communication with the Gate Kiosks 20*a,b*, or equivalent Internet software via the airline network. The input and output flow indicated in block 403 inventory_client_traffic is the communication with the Inventory Client 19. The input and output flow indicated in block 404 com_link_traffic is the communication with the Cabin Server 14 carried by the Ground Router 17 and the Communications Link 16. The input and output flow indicated by block 405 illustrates the database analysis information that is accessed by clients on the airline network.

Figure 10B:
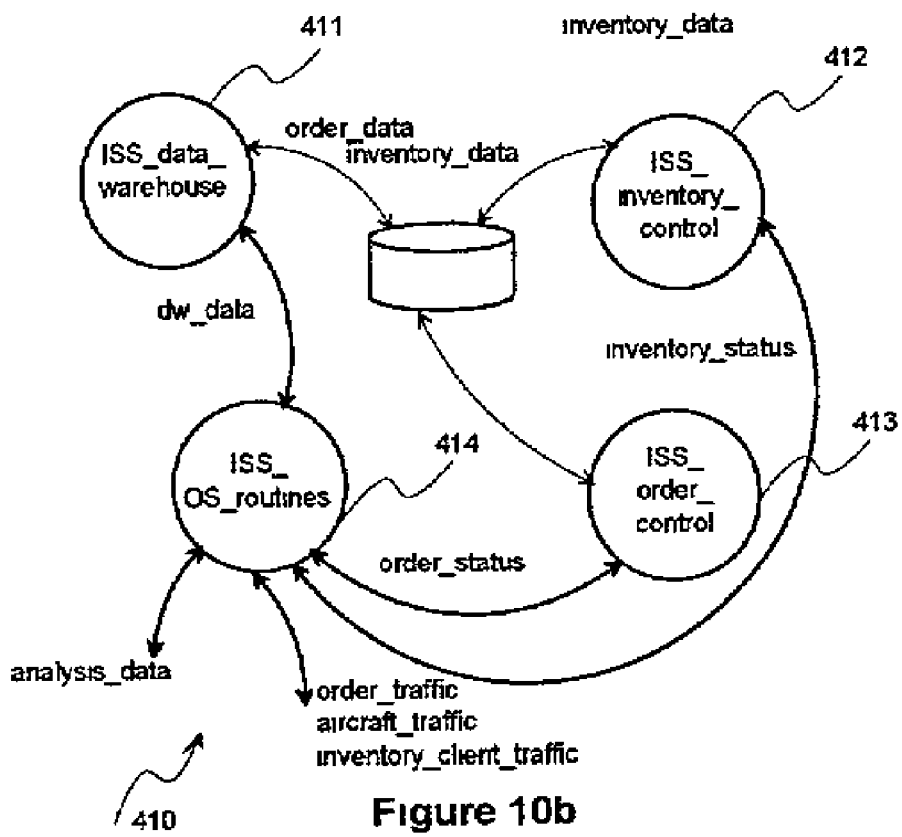
FIG. 10b is Data Flow diagram of the essential software components of the Inventory & Services Server.

In FIG. 10*b* the Inventory & Services Server Data Flow diagram 410 illustrates software architecture and data flow of the preferred embodiment. The software comprises three basic modules in addition to the OS 414 called ISS_OS_routines that provide the GUI and the network transfer functionality.

Figure 15A:
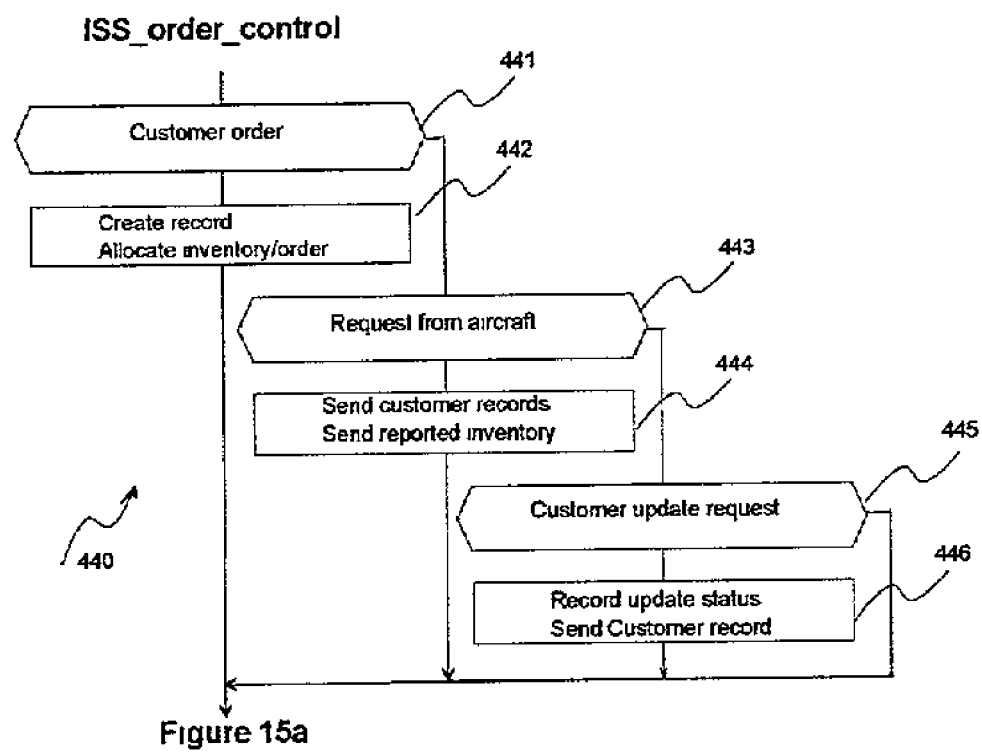
FIG. 15a is flow chart illustrating the logic of the software module for handling customer service requests in the Inventory & Service Server (ISS_order_control)

The module called ISS_order_control 413 is the ground-based customer service server for the Gate Kiosks 20*a,b*, and the Cabin Server 14 in the preferred embodiment of this invention. The OS routines 414 provide the vehicle network information order_traffic and aircraft_traffic. The logic for ISS_order_control 440 is illustrated in FIG. 15*a*. In the customer mode 441 customer data is exchanged with the Gate Kiosk 20*a,b*, or similar Internet software to create a customer record, verify credit card and allocate inventory 442. When initialization requests are received from a vehicle Cabin Server 443, customer records and planned inventory is transmitted 444 via the Ground Router 17 and Communications Link 16. Customer updates from the Gate Kiosks 445 simply update the records and return the new status 446.

Figure 15B:
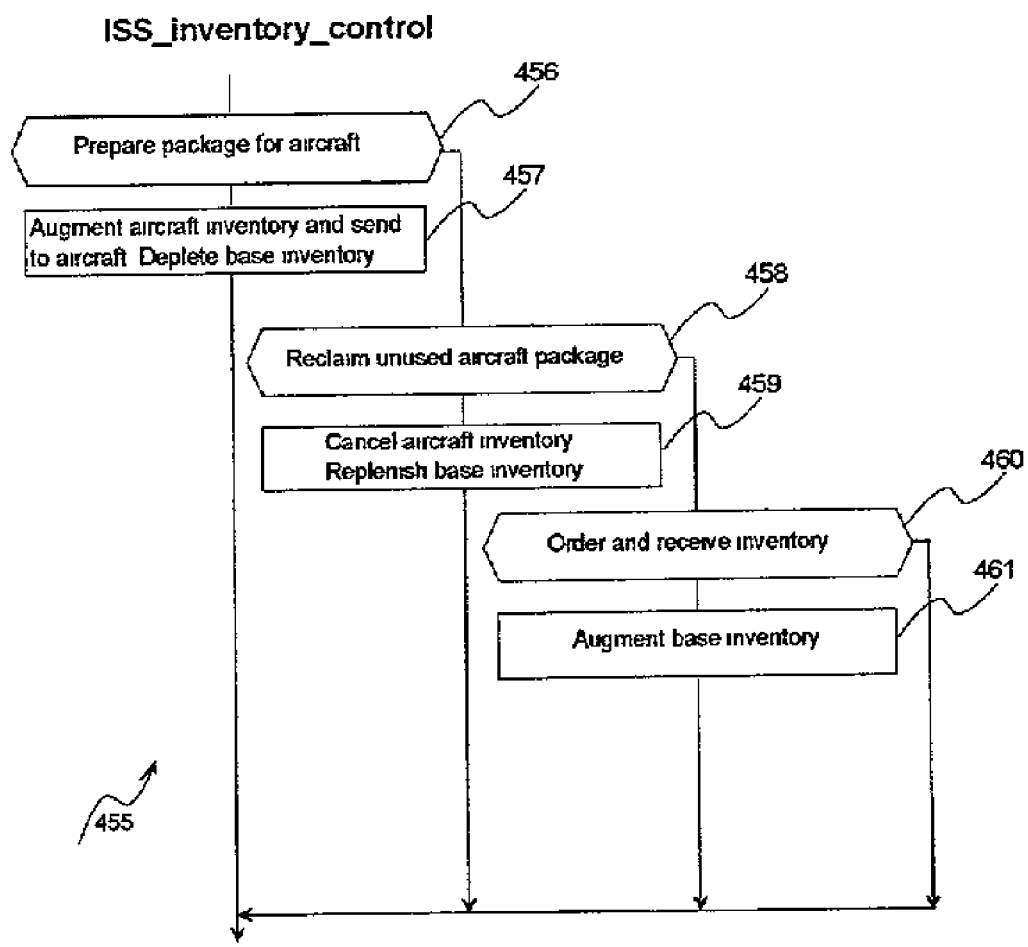
FIG. 15b is flow chart illustrating the logic of the software module for managing inventory in the Inventory & Services Server (ISS_inventory_control)

The module called ISS_inventory_control 412 is the ground-based inventory server, receiving transmitted bar codes from the Inventory Client 19. The module also manages ground-based inventory: preparing a planned inventory for the Cabin Server 14; allocating inventory as a result of requests from the Gate Kiosks 20*a,b* or equivalent Internet Software; and depleting and augmenting stores as a result of vehicle package preparation reported with the Inventory Client. It provides the menus to show the status of current operation and analysis of the databases. The OS routines 414 provide the ground network information, inventory_client_traffic and aircraft_traffic. The logic for ISS_inventory_control 455 is illustrated in FIG. 15*b*. In the aircraft package preparation mode 456, planned inventory is developed using input from the Inventory Client 19 and appropriate stores inventory are adjusted 457. In the reclaim mode 458, bar codes are also received from the Inventory Client and stores adjusted 459. In the replenishment mode 460, inventories are appropriately adjusted 461.

Figure 15C:
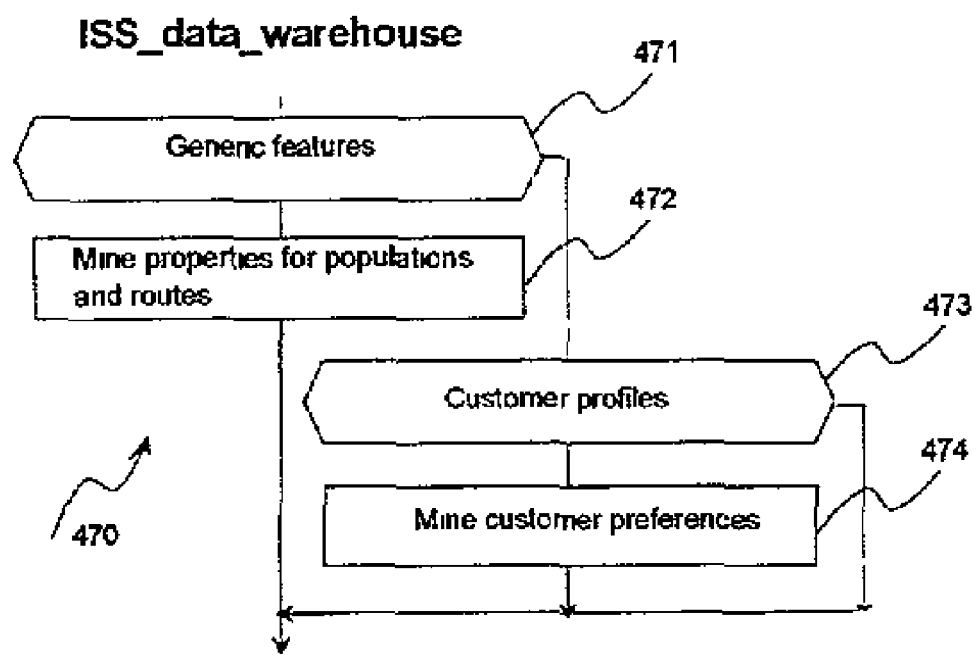
FIG. 15c is flow chart illustrating the logic of the software module for analyzing the database information in the Inventory & Services Server (ISS_data_warehouse)

The module called ISS_data_warehouse 411 is the ground-based data warehouse server, for clients on the airline network. The module uses data mining and other database analysis tools to provide predictive information for inventory management and marketing. The OS routines 414 provide the ground network information, analysis_data. The logic for ISS_data_ware_house 470 is illustrated in FIG. 15*c*. In the generic analysis mode 471, inventory and customer records are mined for inventory planning 472 and in the customer analysis mode 473, the data is mined for specific customer preferences that may be used to support smart menu options at the Gate Kiosks or other customer specific services 474.

Gate Kiosk Member

The Gate Kiosk 20*a,b*, is a client component in the ground-based domain of the network, communicating with the Inventory & Services Server 18. The purpose of the Gate Kiosk is two fold: 1) to provide a means for all passengers to pre-order products and services, and 2) to provide customer access to the network airborne domain using Passenger Laptops. Equivalent capability in the form of software modules residing on host computers in the airline or company network, or otherwise accessible via the Internet, herein called "equivalent Internet software" may be provided. The preferred embodiment of this invention references a floppy diskette as the medium of configuring the Passenger Laptop using the Gate Kiosk or equivalent Internet software, however, the invention embodies any similar medium that may become widely used in laptop computers.

The typical scenarios described for the Passenger Laptop and Inventory & Services Server demonstrate the functional context within the overall network.

Figure 6:
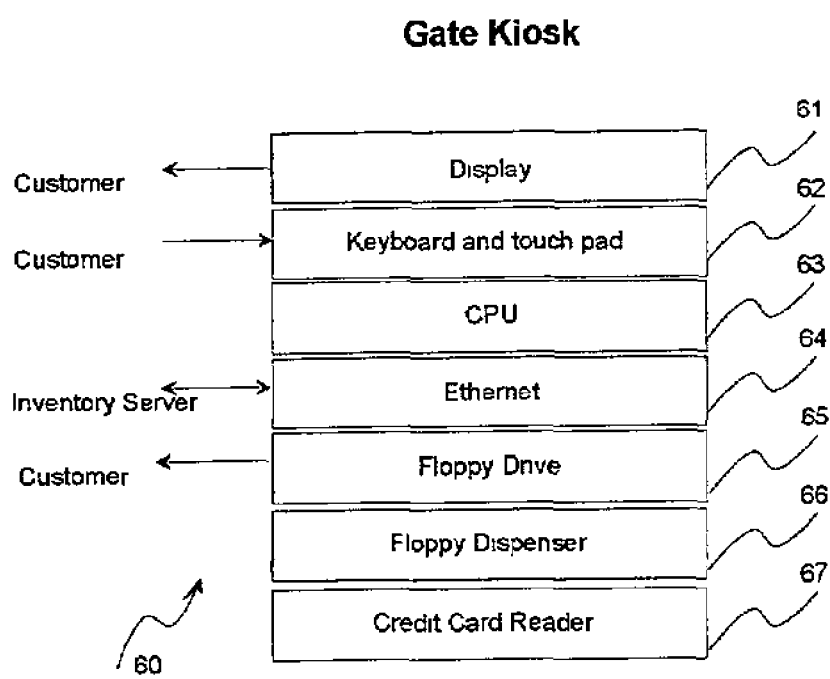
FIG. 6 is a schematic block diagram of the Gate Kiosk showing the essential hardware components.

The hardware configuration 60 of the Gate Kiosk 20*a,b*, in this preferred embodiment of the present invention is shown in FIG. 6. The device is a commercially available computer personal computer in a kiosk structure and sufficiently hardened to withstand extensive public usage. It has a network capability 64 to support communication with the Inventory & Services Server 18, a floppy diskette drive to support configuration of the floppy diskette containing the Floppy Code 65, a floppy diskette dispenser to provide floppy diskettes containing Floppy Code 66, and a credit card reader to permit pre-verification 67. The operational code together with the installed OS comprises the Gate Kiosk code 510 may be downloaded via the network.

Figure 11A:
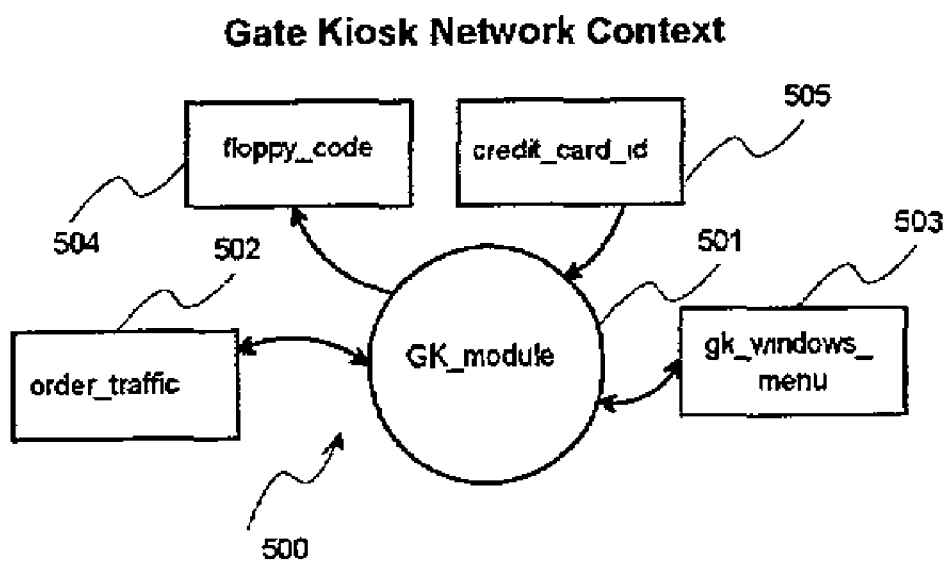
FIG. 11a is a Context diagram of the Gate Kiosk and the network of the present invention.

In FIG. 11*a* the Inventory & Services Server Network Context diagram 500 illustrates the external information flow to other members of the network and the user. The input and output flow indicated in block 502 order_traffic is the communication with the Inventory & Services Server 18. The input and output flow indicated in block 503 gk_windows_menu is interactive menus provided to the user via the OS GUI. The output flow indicated in block 504 floppy_code is the configuration data for the Floppy Code containing the IP address and/or the Floppy Code itself. The input flow indicated by block 505 illustrates the credit card id transmitted by the credit card reader 67.

Figure 11B:
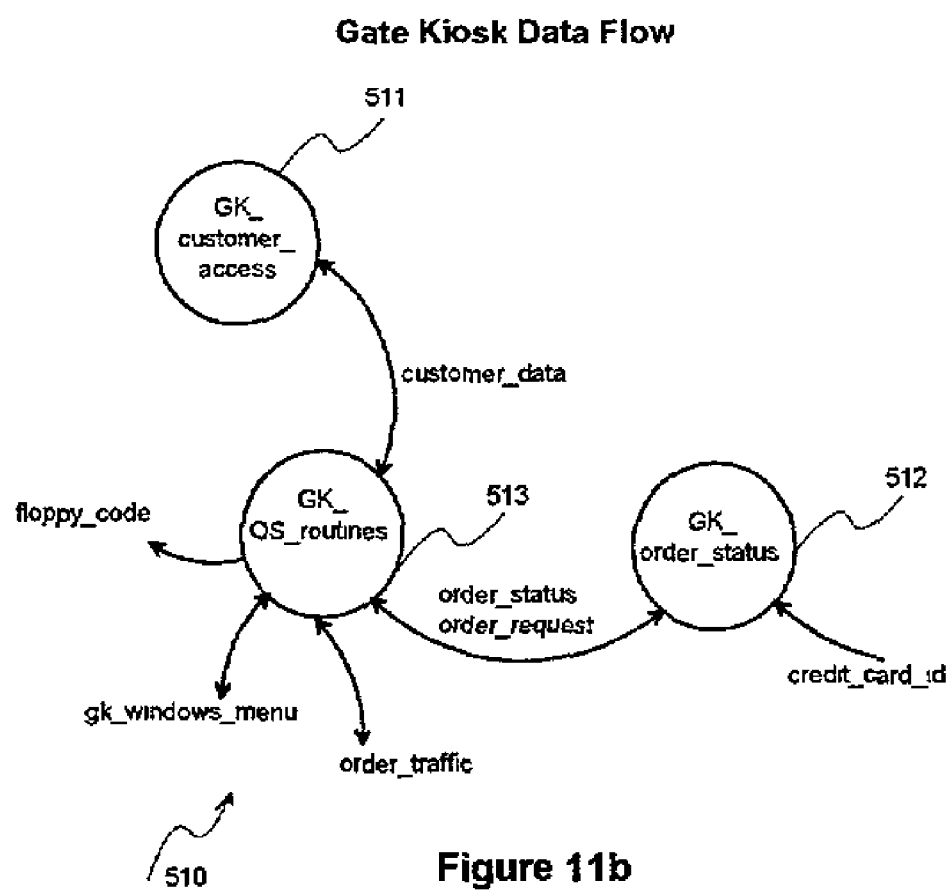
FIG. 11b is Data Flow diagram of the essential software components of the Gate Kiosk.

In FIG. 11*b* the Gate Kiosk Data Flow diagram 510 illustrates software architecture and data flow of the preferred embodiment. The software comprises two basic modules in addition to the OS 513 called GK_OS_routines that provide the GUI and the network transfer functionality.

Figure 16A:
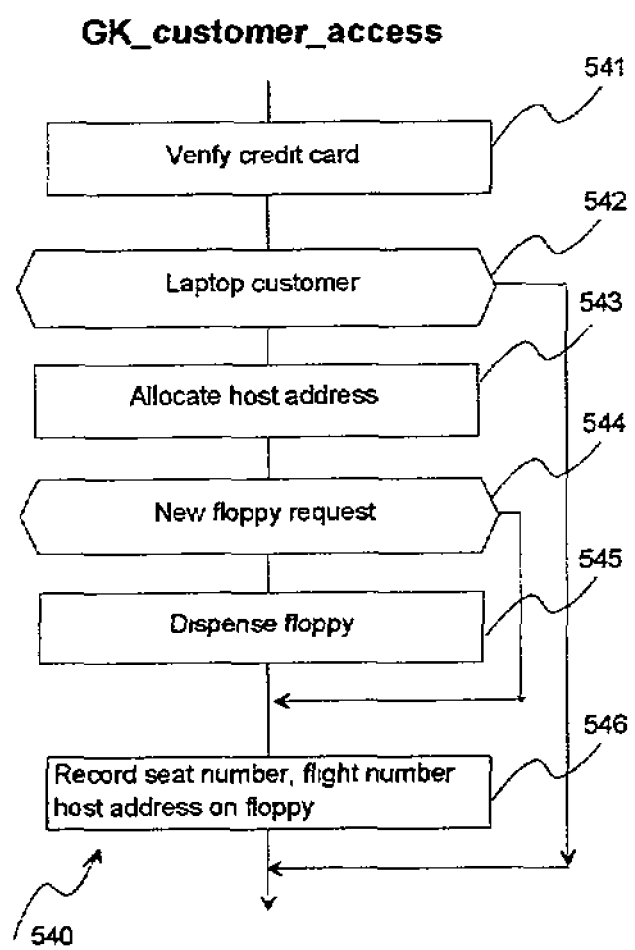
FIG. 16a is flow chart illustrating the logic of the software module for initializing service and storing information to access the vehicle-based domain of the network onto a floppy diskette in the Gate Kiosk (GK_customer_access)

The module called GK_customer_access 511 is the customer service client of the Inventory & Services Server 18 in the preferred embodiment of this invention. It requests a new customer record, verifies the credit card and provides access to the network airborne domain for laptop users. The OS routines 513 provide the vehicle network information order_traffic and the user interface gk_windows_menu. The logic for GK_customer_access 540 is illustrated in FIG. 16*a*. When the user supplies appropriate information related to the trip that may include credit card id, an existing record or newly generated customer record is returned 541. If a the customer wants to configure a laptop 542 as a Passenger Laptop 11*a,b,c*, an appropriate host address is allocated 543. If a new floppy diskette containing Floppy Code is requested 544, a floppy diskette is dispensed 545. The allocated host address is written to the floppy diskette 546.

Figure 16B:
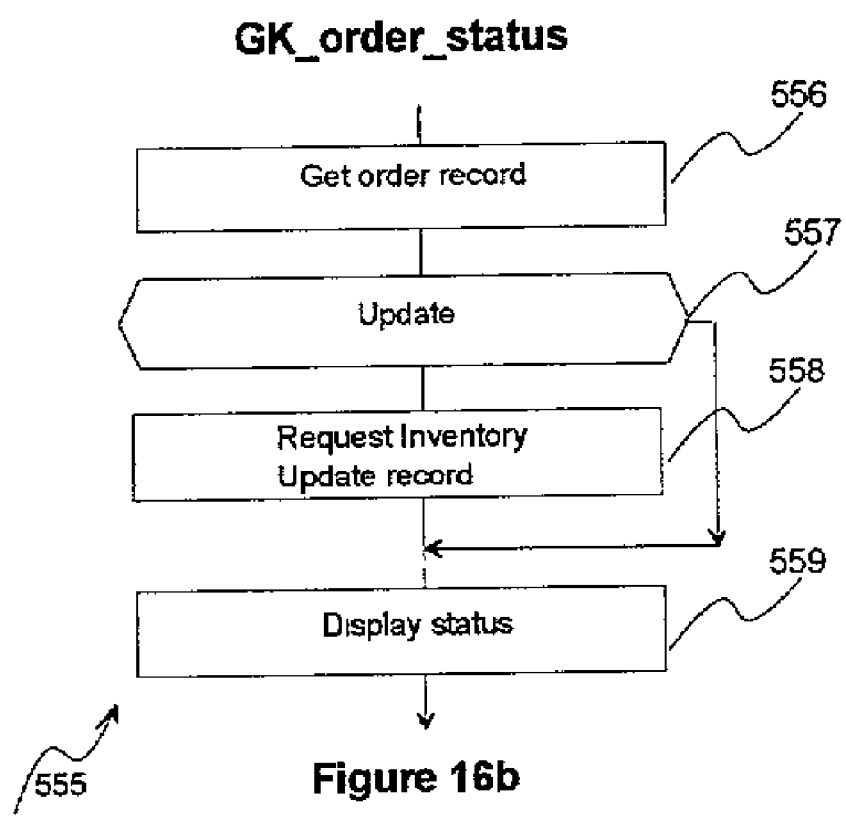
FIG. 16b is flow chart illustrating the logic of the software module for making service requests in the Gate Kiosk (GK_order_status).

The module called GK_order_status 512 is the customer service client of the Inventory & Services Server 18 in the preferred embodiment of this invention. It requests products and services from the Inventory & Services Server. The OS routines 513 provide the vehicle network information order_traffic and the user interface gk_windows_menu. The logic for GK_order_status 555 is illustrated in FIG. 16*b*. When the user supplies the appropriate information, an existing record customer record is returned 556. If a valid record is returned 557, a request to update the records is sent to the Inventory & Services Server 558 and the new status is returned 559.

While the preferred embodiment of the invention has been illustrated and described, it will be appreciated that various changes can be made therein without departing from the spirit and scope of the invention. Accordingly, it is not intended that the scope of the invention in any way be limited by the disclosure, but instead, that it be determined entirely by reference to the claims that follow.

The invention claimed is:

1. A system for fulfilling services orders onboard a transport vehicle, the system comprising:
   (a) a plurality of computers that include an onboard computer transported with the vehicle, and an external computer not transported with the vehicle;
   (b) software installed on the onboard computer, the onboard computer software being operable on the onboard computer for causing the onboard computer to perform tasks including:
      i) obtaining service information from the external computer via communication with the external computer if a communication pathway to the external computer is open; and
      ii) providing access to service information by vehicle personnel for fulfillment of the service orders; and
   (c) software installed on the external computer, the external computer software being operable on the external computer for causing the external computer to perform tasks including:
      i) acquiring information to determine the available services provided on the transport vehicle; and
      ii) managing the delivery of services to the transport vehicle; and
      iii) making service information obtainable by the onboard computer.

2. The system of claim 1, wherein at least some service orders include requests for delivery of products to passengers, and the onboard computer software includes logic routines adapted for managing delivery of products in accordance with service orders, and billing of passengers for fulfillment of service orders.

3. The system of claim 2, wherein the logic routines associate a seat location with each service order.

4. The system of claim 1, wherein the external computer software is further operable on the external computer for accepting service orders prior to boarding and associates each service order with a vehicle departure and makes the information obtainable by the onboard computer.

5. The system of claim 1, wherein the external computer software is further operable on the external computer for analyzing at least one of historical service order information and currently entered service order information, and based on the analysis recommends vehicle inventory, and associates each current service order with a vehicle departure and makes the information obtainable by the onboard computer.

6. The system of claim 1, wherein at least some of the service orders include requests for delivery of products and the external computer software further comprises software logic operable for managing flow of inventory from a terminal to the vehicle and from other sources to the terminal.

7. A system for fulfilling service orders on a transport vehicle, the system comprising an onboard computer transported with the vehicle and connections with electronic devices operated by vehicle personnel or passengers, the onboard computer including software, which when operated on the onboard computer and electronic devices causes the onboard computer to perform tasks comprising providing menu options adapted for specific customer preferences that vary based on pre-selected products and services and historical preference and accepting service orders entered via the electronic devices by vehicle personnel or passengers and making the service orders accessible to vehicle personnel.

8. A system for fulfilling service orders on a transport vehicle, the system comprising an onboard computer transported with the vehicle and connections with electronic devices operated by vehicle personnel or passengers, the onboard computer including software, which when operated on the onboard computer and electronic devices causes the onboard computer to perform tasks comprising accepting service orders entered via the electronic devices by vehicle personnel or passengers and making the service orders accessible to vehicle personnel, wherein the electronic devices include passenger supplied personal information processing apparatus carried on by passengers.

9. The system of claim 8, wherein the connections comprise wireless communication between the passenger supplied personal information processing apparatus carried on by passengers and the onboard computer.

10. The system of claim 7, wherein the electronic devices include handheld computers used by vehicle personnel for creating and accessing service orders on the onboard computer by communication between the handheld computers and the onboard computer.

11. The system of claim 10, wherein the communication between the handheld computers and the onboard computer comprises wireless communication.

12. The system of claim 7, wherein the handheld or onboard computers include hardware and software enabling reading of cards for facilitation of onboard cash-less transactions.

13. The system of claim 7, further comprising an external computer not transported with the vehicle, the external computer including software being operable on the external computer for causing the external computer to perform tasks comprising: a) accepting service orders for passengers via communication with other computers through which service orders are entered; b) making accepted service orders obtainable by the onboard computer, wherein the onboard computer software is operable for obtaining passenger service orders from the external computer if a communication route to the external computer is open; and c) validating credit transactions communicated by the onboard computer if a communication route to the onboard computer is open.

14. The system of claim 13, wherein the external computer software is further operable on the external computer for accepting service orders prior to passenger boarding, and associates each service order with a flight and makes the information obtainable by the onboard computer.

15. The system of claim 13, wherein if a service order includes a request for Internet access, the onboard computer provides Internet access to a connection at a passenger seat location corresponding to the service order, by making use of said communication route.

16. A system for fulfilling service orders on a transport vehicle, the system comprising an external computer not transported with the vehicle, the external computer including software being operable on the external computer for causing the external computer to perform tasks comprising: a) accessing database information pertaining to vehicle departure, destination, past services orders, and inventory information; b) based on the database information, estimating service orders expected to be received and recommending inventory for transport with the vehicle for onboard fulfillment of service orders; and providing menu options adapted for specific customer preferences that vary based on pre-selected products and services and historical preference.

17. The system of claim 16, wherein the external computer accepts service orders via communication with other computers through which service orders are entered.

18. The system of claim 17, wherein the other computers include kiosks at terminal areas.

19. The system of claim 17, wherein the other computers include computers connected to the Internet.

20. The system of claim 17, wherein the external computer software is further operable on the external computer for analyzing currently accepted service orders prior to boarding to determine needed inventory for onboard service order fulfillment and associates each service order with a vehicle departure and makes the information obtainable by the onboard computer.

21. The system of claim 16, wherein the external computer software is further operable on the external computer for recommending based on the database information, inventory for terminal storage for replenishing onboard inventory.

22. The system of claim 16, further comprising an onboard computer, including software installed on the onboard computer, the onboard computer software being operable on the onboard computer for causing the onboard computer to perform tasks including: a) obtaining service information from the external computer via communication with the external computer if a communication pathway to the external computer is open; and b) providing access to service information by vehicle personnel for fulfillment thereof.

23. The system of claim 16, wherein at least some of the service orders include requests for delivery of products and the external computer software further comprising software logic operable for managing flow of inventory from the terminal to the vehicle and from other sources to the terminal.

24. The system of claim 22 wherein the onboard computer software further comprises routines used to manage product flow on the vehicle and residual product flow off the vehicle.

25. The system of claim 1, further comprising handheld computers used by vehicle personnel for creating and accessing service orders on the onboard computer by communication between the handheld computers and the onboard computer.

* * * * *